US 9,245,356 B2

(12) United States Patent
Shibahara et al.

(10) Patent No.: US 9,245,356 B2
(45) Date of Patent: Jan. 26, 2016

(54) IMAGE DECODING METHOD AND IMAGE DECODING APPARATUS

(71) Applicant: Panasonic Intellectual Property Corporation of America, Torrance, CA (US)

(72) Inventors: Youji Shibahara, Osaka (JP); Toshiyasu Sugio, Osaka (JP); Kyoko Tanikawa, Osaka (JP); Toru Matsunobu, Osaka (JP); Hisao Sasai, Osaka (JP); Kengo Terada, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 19 days.

(21) Appl. No.: 14/024,978

(22) Filed: Sep. 12, 2013

(65) Prior Publication Data

US 2014/0079329 A1 Mar. 20, 2014

Related U.S. Application Data

(60) Provisional application No. 61/702,283, filed on Sep. 18, 2012.

(51) Int. Cl.
*G06K 9/36* (2006.01)
*G06T 9/00* (2006.01)
(Continued)

(52) U.S. Cl.
CPC ............... *G06T 9/008* (2013.01); *H04N 19/44* (2014.11); *H04N 19/463* (2014.11); *H04N 19/89* (2014.11); *G06K 9/36* (2013.01)

(58) Field of Classification Search
CPC .............. H04N 19/00775; H04N 19/00533; H04N 19/00812; H04N 7/50; H04N 19/00424; H04N 7/26244; H04N 19/00781; H04N 19/00084; H04N 19/00018; H04N 19/00296; H04N 19/00951; H04N 19/0009; H04N 19/00096; H04N 19/124; H04N 19/122; H04N 19/126; H04N 19/13; H04N 19/30; H04N 17/16; H04N 19/176; H04N 19/159; H04N 19/44; H04N 19/157; H04N 19/36; H04N 19/91; H04N 19/14; H04N 19/103; H04N 19/597; G06T 9/007; G06T 9/008; G06F 17/147; H03M 7/3068
USPC ................. 382/233, 234, 250, 351, 248, 239; 375/315, 330, 340, 240; 348/401, 248, 348/250
See application file for complete search history.

(56) References Cited

U.S. PATENT DOCUMENTS 4,805,017 A * 2/1989 Kaneko et al. ............. 348/401.1
5,369,502 A * 11/1994 Fukuda et al. ............ 358/426.12
(Continued)

OTHER PUBLICATIONS

ISO/IEC 14496-10 (MPEG-4 Part10: Advanced Video Coding), Oct. 1, 2004.

*Primary Examiner* — Vu Le
*Assistant Examiner* — Aklilu Woldemariam
(74) *Attorney, Agent, or Firm* — Wenderoth, Lind & Ponack, L.L.P.

(57) ABSTRACT

An image decoding method includes: obtaining setting information for setting a first quantization matrix; and inverse-quantizing coefficients of the image, using the first quantization matrix set according to the setting information. In the inverse-quantizing: when the setting information includes specifying information for specifying a second quantization matrix and the second quantization matrix specified by the specifying information is referable, the second quantization matrix is set as the first quantization matrix; and when the setting information includes the specifying information and the second quantization matrix specified by the specifying information is not referable, a third quantization matrix which is referable may be set as the first quantization matrix.

13 Claims, 30 Drawing Sheets

(51) Int. Cl.
*H04N 19/463* (2014.01)
*H04N 19/44* (2014.01)
*H04N 19/89* (2014.01)

(56) References Cited

U.S. PATENT DOCUMENTS

| | | | | |
|---|---|---|---|---|
| 5,389,973 | A * | 2/1995 | Kitamura | H04N 5/9264 348/27 |
| 5,430,556 | A * | 7/1995 | Ito | 382/251 |
| 5,689,346 | A * | 11/1997 | Noda et al. | 358/426.11 |
| 5,761,342 | A * | 6/1998 | Yoshida | 382/234 |
| 5,808,683 | A * | 9/1998 | Tong et al. | 375/240.11 |
| 5,818,532 | A * | 10/1998 | Malladi | H04N 19/00 375/240.03 |
| 5,844,614 | A * | 12/1998 | Chong et al. | 375/240.24 |
| 6,282,322 | B1 | 8/2001 | Rackett | 382/248 |
| 6,658,058 | B1 * | 12/2003 | Kuroda | H04N 21/6377 375/240.12 |
| 6,658,157 | B1 * | 12/2003 | Satoh | G06F 17/147 375/E7.143 |
| 7,373,009 | B2 * | 5/2008 | Winger | H04N 19/61 375/E7.14 |
| 8,046,214 | B2 * | 10/2011 | Mehrotra | G10L 19/008 341/155 |
| 8,249,883 | B2 * | 8/2012 | Mehrotra | G10L 19/008 341/155 |
| 8,594,186 | B1 * | 11/2013 | Denolf | H04N 19/105 375/240.02 |
| 2002/0094025 | A1 * | 7/2002 | Hanamura | H04N 21/234327 375/240.01 |
| 2003/0003171 | A1 * | 1/2003 | Goswami et al. | 424/769 |
| 2003/0031371 | A1 * | 2/2003 | Kato | G06T 9/00 382/239 |
| 2003/0147463 | A1 * | 8/2003 | Sato | H04N 19/00096 375/240.05 |
| 2005/0169547 | A1 * | 8/2005 | Mihara | H04N 19/126 382/239 |
| 2006/0171463 | A1 * | 8/2006 | Hanamura | H04N 21/2662 375/240.13 |
| 2007/0071093 | A1 * | 3/2007 | Shi et al. | 375/240.03 |
| 2007/0248276 | A1 * | 10/2007 | Yahata | H04N 19/176 382/251 |
| 2008/0025409 | A1 * | 1/2008 | Tseng et al. | 375/240.25 |
| 2008/0089410 | A1 * | 4/2008 | Lu | H04N 19/159 375/240.03 |
| 2008/0260272 | A1 * | 10/2008 | Wada | 382/239 |
| 2009/0252233 | A1 * | 10/2009 | Ji et al. | 375/240.25 |
| 2010/0091842 | A1 * | 4/2010 | Ikeda | H04N 19/176 375/240.03 |
| 2010/0202513 | A1 * | 8/2010 | Arakawa et al. | 375/240.03 |
| 2011/0206118 | A1 * | 8/2011 | Bivolarsky et al. | 375/240.12 |
| 2011/0249755 | A1 * | 10/2011 | Shibahara et al. | 375/240.18 |
| 2012/0082242 | A1 * | 4/2012 | Narroschke et al. | 375/240.25 |
| 2012/0128066 | A1 * | 5/2012 | Shibahara | H04N 19/122 375/240.03 |
| 2013/0101033 | A1 * | 4/2013 | Joshi | H03M 7/3068 375/240.12 |
| 2013/0251032 | A1 * | 9/2013 | Tanaka | H04N 19/44 375/240.03 |
| 2014/0050262 | A1 * | 2/2014 | Sakurai | H04N 19/00096 375/240.03 |
| 2014/0072037 | A1 * | 3/2014 | Sato | 375/240.03 |
| 2014/0321539 | A1 * | 10/2014 | Tanaka | H04N 19/00096 375/240.03 |

* cited by examiner

FIG. 18

Video stream (PID=0x1011, Primary video)
Audio stream (PID=0x1100)
Audio stream (PID=0x1101)
Presentation graphics stream (PID=0x1200)
Presentation graphics stream (PID=0x1201)
Interactive graphics stream (PID=0x1400)
Video stream (PID=0x1B00, Secondary video)
Video stream (PID=0x1B01, Secondary video)

FIG. 29

| Corresponding standard | Driving frequency |
|---|---|
| MPEG-4 AVC | 500 MHz |
| MPEG-2 | 350 MHz |
| ⋮ | ⋮ |

IMAGE DECODING METHOD AND IMAGE DECODING APPARATUS

CROSS REFERENCE TO RELATED APPLICATION

The present application claims the benefit of U.S. Provisional Patent Application No. 61/702,283 filed Sep. 18, 2012. The entire disclosures of the above-identified application, including the specification, drawings and claims are incorporated herein by reference in their entirety.

FIELD

The present disclosure relates to an image decoding method for decoding images.

BACKGROUND

As a technique regarding an image decoding method for decoding images (including video), there is the technique disclosed in Non Patent Literature (NPL) 1.

CITATION LIST

Non Patent Literature

[NPL 1] ISO/IEC 14496-10 "MPEG-4 Part 10 Advanced Video Coding"

SUMMARY

Technical Problem

However, due to the impact of improvement of coding efficiency, an unexpected error may occur in the decoding of an image.

In view of this, the non-limiting and exemplary embodiments provide an image decoding method capable of improving error tolerance in the decoding of an image coded with high coding efficiency.

Solution to Problem

An image decoding method according to an aspect of the present disclosure is an image decoding method for decoding an image, the image decoding method including: obtaining setting information for setting a first quantization matrix to be used in the decoding of the image; and decoding coefficients of the image, using the first quantization matrix set according to the setting information, wherein, in the decoding: when the setting information includes specifying information for specifying a second quantization matrix and the second quantization matrix specified by the specifying information is referable, the second quantization matrix is set as the first quantization matrix; and when the setting information includes the specifying information and the second quantization matrix specified by the specifying information is not referable, a third quantization matrix which is referable is set as the first quantization matrix.

It should be noted that these general and specific aspects may be implemented using a system, an apparatus, an integrated circuit, a computer program, or a computer-readable recording medium such as a CD-ROM, or any combination of systems, apparatuses, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

An image decoding method according to the present disclosure is capable of improving error tolerance in decoding of an image coded with a high coding efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 18 is a diagram showing a structure of multiplexed data.

FIG. 29 is a diagram showing an example of a look-up table in which video data standards are associated with driving frequencies.

Figure 1:
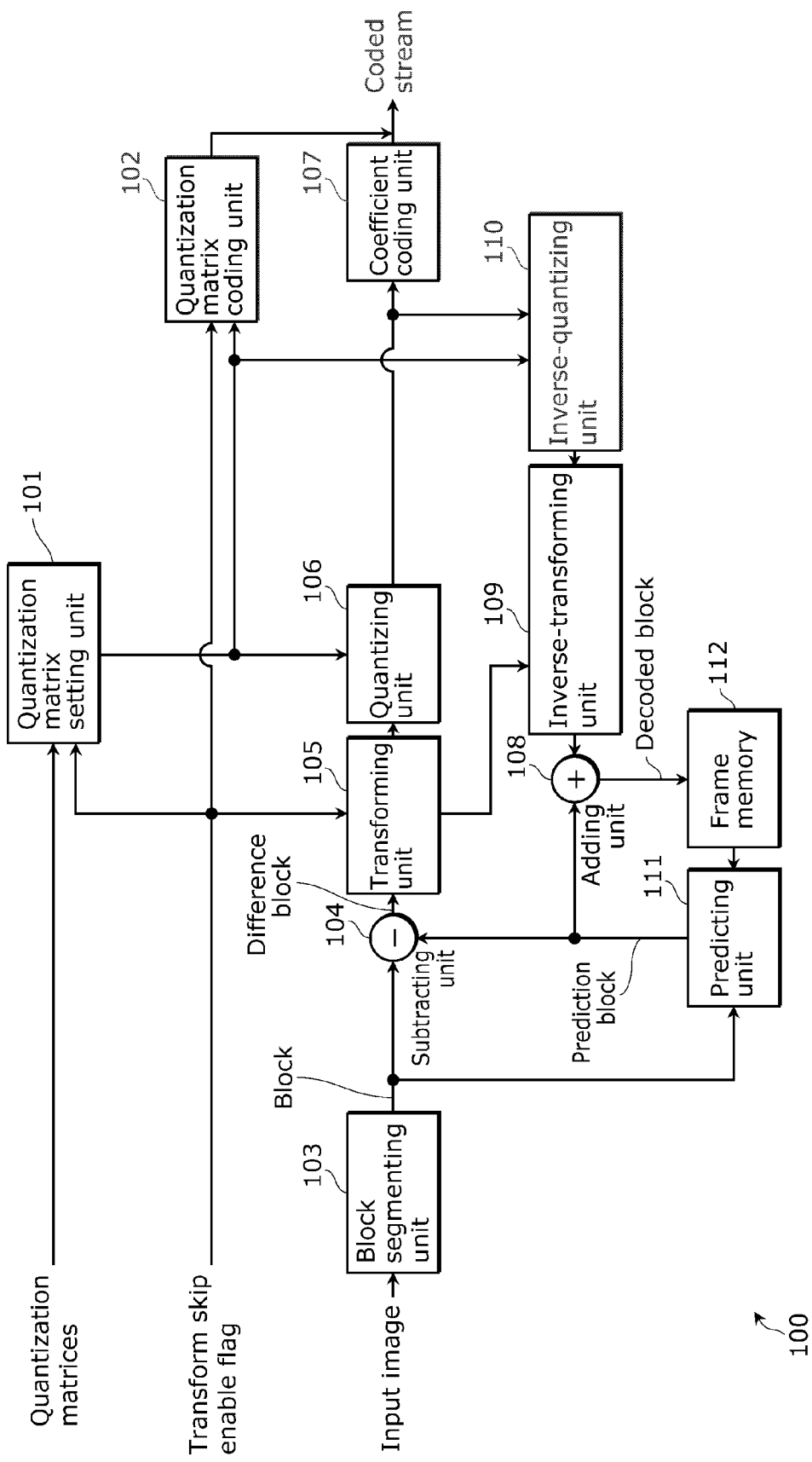
FIG. 1 is a diagram showing a configuration of an image coding apparatus according to Embodiment 1.

DESCRIPTION OF EMBODIMENTS (Underlying Knowledge Forming Basis of the Present Disclosure)

The inventors have found problems relating to the image decoding method for decoding an image, disclosed in the "Background" section. These problems are specifically described below.

Recent years have seen a significant advancement in digital video device technology, and opportunities for compression-coding video signals (of pictures arranged in chronological order) inputted from a video camera or a television tuner and recording them on a recording medium such as a DVD or a hard disk has been increasing.

The coding of a video signal includes a step of predicting an image, a step of calculating a difference between a prediction image and the coding-target image, a step of transforming a difference image into frequency coefficients, a step of quantizing the frequency coefficients, and a step of variable-length-coding the quantization result, prediction information, and so on.

Quantization may involve the use of quantization matrices. Here, coding efficiency is improved by performing rough quantization on high frequency coefficients for which deterioration is not visually noticeable and, conversely, performing fine quantization on low frequency coefficients for which deterioration is visually noticeable. Furthermore, various types of quantization matrices corresponding to frequency conversion sizes, such as 4×4, 8×8, or the like, prediction modes such as intra prediction and inter prediction, and pixel components such as luma and chroma, are used.

It should be noted that quantization refers to digitalization of values sampled at a predetermined interval, in association with predetermined levels. In this technical field, expressions such as truncation, rounding, and scaling may be used to mean quantization.

Methods using quantization matrices include a method which uses quantization matrices directly set by the image coding apparatus, and a method which uses default quantization matrices. By directly setting the quantization matrices, the image coding apparatus can set quantization matrices suitable for image features. However, in this case, there is the disadvantage that, since the image coding apparatus codes quantization matrices, the amount of code is increased by that much.

On the other hand, there is a method of quantizing the high frequency coefficients and the low frequency coefficients in the same manner, without using quantization matrices. It should be noted that this method is equivalent to a method which uses quantization matrices in which all the coefficients have the same value.

In the video coding standard called H.264/AVC or MPEG-4 AVC (see NPL 1), quantization matrices are specified by a sequence parameter set (SPS) or a picture parameter set (PPS). The SPS includes parameters used for a sequence, and the PPS includes parameters used for a picture. There are cases where the SPS and the PPS are simply referred to as a parameter sets.

A quantization matrix is set according to a MatrixPresentFlag and a ListPresentFlag in each of the SPS and the PPS. When the MatrixPresentFlag in the SPS indicates 0, the coefficients of the high-frequency component and the coefficients of the low-frequency component are quantized in the same manner, without using a quantization matrix. On the other hand, when the MatrixPresentFlag indicates 1, the quantization matrix to be used in the target picture is set using the ListPresentFlag.

There are plural quantization matrices according to the frequency conversion size, the prediction mode, and the pixel component. There is a ListPresentFlag for each quantization matrix, and each indicates whether or not the default quantization matrix is to be used. When the default quantization matrix is not to be used, the quantization matrix to be used is coded using another syntax.

Furthermore, when the MatrixPresentFlag in the PPS indicates 0, the information of the quantization matrix set in the SPS is used. When the MatrixPresentFlag indicates 1, the quantization matrix to be used in the target sequence is set using the ListPresentFlag. Like the ListPresentFlags in the SPS, each of the ListPresentFlags in the PPS also indicates whether or not the default quantization matrix is to be used.

Furthermore, quantization matrices are used by being classified on an orthogonal transform size basis (4×4, 8×8, 16×16, 32×32), on a color space component basis (luma Y, chroma Cb, chroma Cr), and on a prediction method basis (intra prediction, inter prediction). The information for identifying these types is the matrixID.

Here, matrixID=0 indicates the quantization matrix to be used on the luma Y in intra prediction. Also, matrixID=1 indicates the quantization matrix to be used on the chroma Cb in intra prediction, matrixID=2 indicates the quantization matrix to be used on the chroma Cr in intra prediction, matrixID=3 indicates the quantization matrix to be used on the luma Y in inter prediction, matrixID=4 indicates the quantization matrix to be used on the chroma Cb in inter prediction, matrixID=5 indicates the quantization matrix to be used on the chroma Cr in inter prediction. Depending on the size, there is derivation of definition.

In the coding of quantization matrices, quantization matrices from matrixID=0 to matrixID=5 are sequentially coded for a certain size. Although, it is possible to code quantization matrices that are all different for these 6 types to maximize image quality, it is also possible, on the other hand, to copy the same quantization matrix in order to suppress the increase in the amount of code for quantization matrices.

Specifically, a scaling_list_pred_mode_flag indicating 0 means copying and using an already transmitted quantization matrix, or the like. The same flag indicating 1 means coding the contents (matrix values) of the quantization matrix. When the scaling_list_pred_mode_flag indicates 0, scaling_list_pred_matrix_id_delta is coded.

It should be noted that, in the present Specification, there are cases where the scaling_list_pred_mode_flag is abbreviated as sl_pred_mode, and the scaling_list_pred_matrix_id_delta is abbreviated as DeltaID.

A value obtained by subtracting DeltaID from the values of the target matrixID is called RefID, and the RefID indicates the copy source matrixID. For example, for matrixID=2 (the quantization matrix to be used in the chroma Cr in intra prediction), when DeltaID=1, RefID=1. RefID=1 indicates the chroma Cb in intra prediction. Therefore, in this case, the already-coded quantization matrix used on the chroma Cb in intra prediction is used as the quantization matrix for the chroma Cr in intra prediction.

A data unit in which quantization matrices corresponding to combinations of sizes and matrixIDs are compiled is called scaling_list_data. The scaling_list_data is coded inside the SPS or the PPS.

However, when there is an error in the scaling_list_data, decoding of an image is difficult. For example, due to an error in the DeltaID included in the scaling_list_data, there are cases where the copy source quantization matrix is not referable. Then, in such a case, the image decoding apparatus is unable to continue the decoding of the image and the decoding of the image may stop.

Furthermore, in the aforementioned operation, the DeltaID is coded for all of matrixID=0 to 5. In particular, even in the case where matrixID=0, DeltaID is coded even though the copy source quantization matrix does not actually exist. Therefore, the amount of code is increased unnecessarily.

In view of this, an image decoding method according to an aspect of the present disclosure is an image decoding method for decoding an image, the image decoding method may include: obtaining setting information for setting a first quantization matrix to be used in the decoding of the image; and decoding coefficients of the image, using the first quantization matrix set according to the setting information, wherein, in the decoding: when the setting information includes specifying information for specifying a second quantization matrix and the second quantization matrix specified by the specifying information is referable, the second quantization matrix may be set as the first quantization matrix; and when the setting information includes the specifying information and the second quantization matrix specified by the specifying information is not referable, a third quantization matrix which is referable may be set as the first quantization matrix.

Accordingly, when a quantization matrix is non-referable, another quantization matrix, which is referable, is used. For example, in order to improve coding efficiency, there are cases where specifying information for specifying a quantization matrix is coded instead of plural matrix values. However, when the specifying information is erroneous, there is a possibility that the quantization matrix specified by the specifying information is non-referable. In such a case, another quantization matrix, which is referable, is used. Therefore, error tolerance in decoding of an image coded with a high coding efficiency improves.

For example, in the obtaining, the setting information for setting quantization matrices by assigning an order number to each of the quantization matrices may be obtained.

Accordingly, plural quantization matrices can be set according to the order number of the respective quantization matrices.

Furthermore, for example, in the decoding, when the setting information includes the specifying information and the second quantization matrix to be specified by the specifying information has an order number lower than a leading order number assigned to any one of the quantization matrices, the third quantization matrix may be set as the first quantization matrix.

Accordingly, when a quantization matrix does not exist, the coefficients are decoded using another quantization matrix.

Furthermore, for example, in the decoding, when the setting information includes the specifying information and the second quantization matrix to be specified by the specifying information has an order number higher than an order number of the first quantization matrix, the third quantization matrix may be set as the first quantization matrix.

Accordingly, when a quantization matrix is not yet set, the coefficients are decoded using another quantization matrix.

Furthermore, for example, in the decoding, when the setting information includes the specifying information indicating a difference obtained by subtracting an order number of the second quantization matrix from an order number of the first quantization matrix, and the difference is higher than the order number of the first quantization matrix, the third quantization matrix may be set as the first quantization matrix.

Accordingly, when a quantization matrix does not exist, the coefficients are decoded using another quantization matrix.

Furthermore, for example, in the decoding, when the setting information includes the specifying information indicating a difference obtained by subtracting an order number of the second quantization matrix from an order number of the first quantization matrix, and the difference is a negative number, the third quantization matrix may be set as the first quantization matrix.

Accordingly, when a quantization matrix is not yet set, the coefficients are decoded using another quantization matrix.

Furthermore, for example, in the obtaining, the setting information for setting quantization matrices by assigning an order number to each of the quantization matrices may be obtained, each of the quantization matrices corresponding to a different one of combinations of (i) prediction modes including an intra prediction mode and an inter prediction mode and (ii) components including a luma component and a chroma component, and, in the decoding, the coefficients may be decoded using the first quantization matrix corresponding to a combination of a first prediction mode and a first component.

Accordingly, a quantization matrix which is in accordance with the combination of a prediction mode and an image component is used.

Furthermore, for example, the third quantization matrix may be a quantization matrix assigned with an order number lower than an order number of the first quantization matrix.

Accordingly, when a quantization matrix is non-referable, another quantization matrix, which has been set ahead, is used.

It is assumed that the other quantization matrix which has been set ahead has a relatively suitable value. Therefore, the coefficients of the image are coded using the other quantization matrix which has a relatively suitable value.

Furthermore, for example, the third quantization matrix may be a quantization matrix assigned with a leading order number, among the quantization matrices.

Accordingly, an increase in the amount of calculation for selecting another quantization matrix is suppressed, and the coefficients of the image are coded using the other quantization matrix which has a relatively suitable value.

Furthermore, for example, the third quantization matrix may be a predetermined default quantization matrix.

Accordingly, when a quantization matrix is non-referable, a default quantization matrix which is more certain to be referable is used. By using a default quantization matrix, an increase in the amount of calculation can be suppressed.

Furthermore, for example, when the first component is the chroma component, the third quantization matrix may be a quantization matrix corresponding to a combination of the first prediction mode and the luma component, among the quantization matrices.

Accordingly, another quantization matrix which corresponds to luma is used as a quantization matrix which corresponds to chroma. It is assumed that the quantization matrix corresponding to chroma and the quantization matrix corresponding to luma are similar. Therefore, another quantization matrix, which is relatively suitable, is referred to.

Furthermore, for example, when the first component is the luma component, the third quantization matrix may be a default quantization matrix.

Accordingly, the default quantization matrix which is more certain to be referable is used as a quantization matrix which corresponds to chroma.

Furthermore, for example, in the decoding, when the setting information includes a matrix value of the first quantization matrix instead of the specifying information, the coefficients may be decoded using the first quantization matrix having the matrix value.

Accordingly, the coefficients of the image can be suitably decoded using individually set quantization matrices.

Furthermore, in an image coding method and image decoding method according to an aspect of the present disclosure, coding and decoding of the DeltaID is skipped when matrixID=0. This allows the amount of data and the amount of processing to be reduced.

It should be noted that these general and specific aspects may be implemented using a system, an apparatus, an integrated circuit, a computer program, or a computer-readable recording medium such as a CD-ROM, or any combination of systems, apparatuses, integrated circuits, computer programs, or computer-readable recording media.

Hereinafter, embodiments shall be described in detail with reference to the drawings. It is to be noted that each of the embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims. Therefore, among the structural elements in the following embodiments, structural elements not recited in any one of the independent claims defining the most generic concept are described as arbitrary structural elements.

Furthermore, in the subsequent description, there are cases where coding is used to mean encoding.

Embodiment 1

[Configuration (Coding as a Whole)]

FIG. 1 shows a configuration of an image coding apparatus in this embodiment. As shown in FIG. 1, an image coding apparatus 100 in this embodiment includes a quantization matrix setting unit 101, a quantization matrix coding unit 102, a block segmenting unit 103, a subtracting unit 104, a transforming unit 105, a quantizing unit 106, a coefficient coding unit 107, an adding unit 108, an inverse-transforming unit 109, an inverse-quantizing unit 110, a predicting unit 111, and a frame memory 112.

[Operation (Coding as a Whole)]

Figure 2:
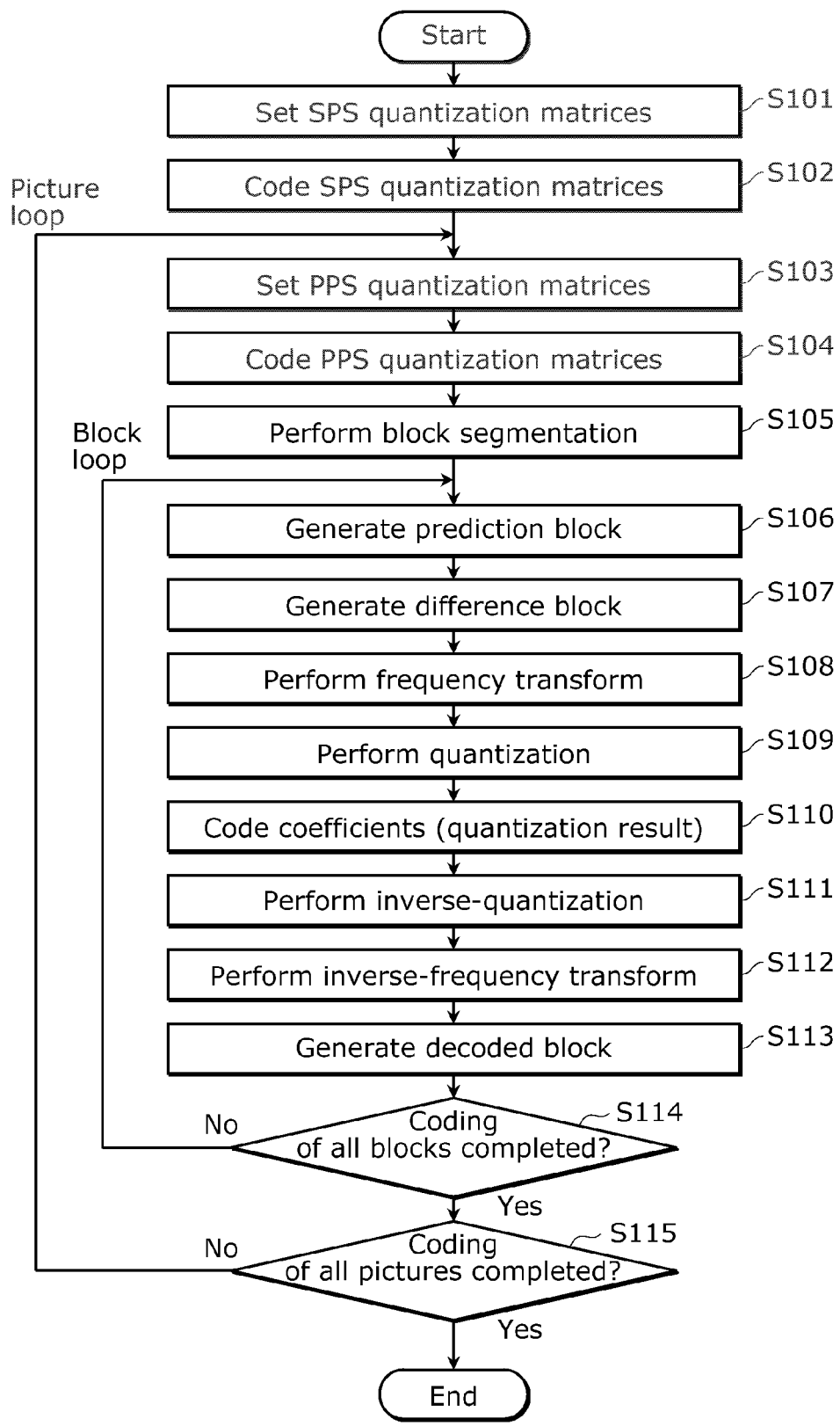
FIG. 2 is a diagram showing an overall flow of coding according to Embodiment 1.

Next, the flow of coding as a whole shall be described with reference to FIG. 2. First, the quantization matrix setting unit 101 sets SPS quantization matrices which are the quantization matrices to be used for a target sequence (S101). The SPS quantization matrices are set according to inputs from outside, image features, transform skip enable flags (TransformSkipEnableFlag or enable_transform_skip_flag), or the like.

The transform skip enable flag is a flag which indicates whether or not to permit skipping of a process for transforming pixel data into frequency coefficients. There are cases where coding efficiency is improved through the skipping of the transform process. The transform skip enable flag indicates that skipping of the transform process is prohibited when the flag indicates 0, and that skipping of the transform process is permitted when the flag indicates 1.

Next, the quantization matrix coding unit 102 codes the SPS quantization matrices (S102). Details shall be described later. It should be noted that the subsequent processes for the picture (S103 to S115) are executed for each of the pictures in the sequence. Therefore, the subsequent processes are repeated plural times corresponding to the number of pictures in the sequence.

Next, the quantization setting unit 101 sets the PPS quantization matrices which are the quantization matrices to be used for the target picture (S103). The PPS quantization matrices are set according to inputs from outside, image features, transform skip enable flags, or the like. Next, the quantization matrix coding unit 102 codes the PPS quantization matrices (S104). Details shall be described later.

Next, the block segmenting unit 103 segments the input image into blocks (coding units), and sequentially outputs the blocks to the subtracting unit 104 and the predicting unit 111 (S105). The blocks have variable sizes. The block segmenting unit 103 segments the image using the image features. The minimum block size is 8 pixels×8 pixels in the horizontal and vertical directions, and the maximum block size is 64 pixels× 64 pixels in the horizontal and vertical directions.

It should be noted that subsequent processes for a block (S106 to S114) are performed for each block in one picture. Accordingly, the subsequent processes are repeated plural times corresponding to the number of blocks in the picture.

Next, the predicting unit 111 generates a prediction block from the block and a decoded image stored in the frame memory 112 (S106). The subtracting unit 104 generates a difference block from the input image and the prediction block (S107).

Next, the transforming unit 105 transforms the difference block into frequency coefficients (S108). At this time, a transform skip enable flag is inputted. When the transform skip enable flag indicates 1 (skipping permitted), the transforming unit 105 switches between execution and non-execution of a transform process according to features (size and so on) of the difference block. Then, when not executing the transform process, the transforming unit 105 outputs the difference block as it is to the quantizing unit 106. When executing the transform process, the transforming unit 105 performs a frequency transform process on the difference block and outputs resulting frequency coefficients to the quantizing unit 106.

On the other hand, when the transform skip enable flag indicates 0 (skipping prohibited), the transforming unit 105 performs the frequency transform process independently of any feature of the difference block, and outputs the resulting frequency coefficients to the quantizing unit 106.

It should be noted that the skipping of the transform process is performed only when the transform size is 4×4. When the transform size is not 4×4, the transform process is performed independently of any transform skip enable flag. The transform size is a variable size of 4×4 or greater, and may be smaller than the size of a block (coding unit).

Next, the quantizing unit 106 quantizes output data from the transforming unit 105 (S109). At this time, the output data is quantized using the PPS quantization matrices which have been set in step S103. There are cases where the output data from the transforming unit 105 is the difference block itself or the frequency coefficients, depending on the transform skip enable flag and the features of the difference block. Next, the coefficient coding unit 107 codes the quantized result (S110). The coding uses variable-length coding such as arithmetic coding.

Next, the inverse-quantizing unit 110 inverse-quantizes the quantized result to reconstruct the frequency coefficients or the difference block (S111). At this time, the inverse-quantizing unit 110 inverse-quantizes the quantized result using the PPS quantization matrices which have been set in step S103. Inverse-quantization is a process for restoring a quantized signal to the original signal, and more specifically is a process for restoring data whose accuracy was decreased in the quantization process to highly accurate data, using quantization matrices. As such, there are cases where inverse-quantization is also referred to as scaling as in the case of quantization.

Next, the inverse-transforming unit 109 transforms the frequency coefficients into pixel data to reconstruct the difference block (S112). At this time, information indicating whether or not the frequency transform process was skipped for the target block is inputted from the transforming unit 105 to the inverse-transforming unit 109. When the frequency transform process was skipped, the inverse-frequency transform process is also skipped. It should be noted that, in this technical field, in general, the inverse-quantization process and the inverse-transform process are performed at the same time in order to reduce multiplication operations.

Next, the adding unit 108 adds up the reconstructed difference block and the prediction block to generate a decoded block, and stores the decoded block in the frame memory 112 (S113). Hereinafter, the quantization matrix coding unit 102 shall be described in detail. The quantization matrix coding unit 102 codes the quantization matrices (SPS quantization matrices and the PPS quantization matrices).

[Operation (Coding of Quantization Matrices)]

Figure 3:
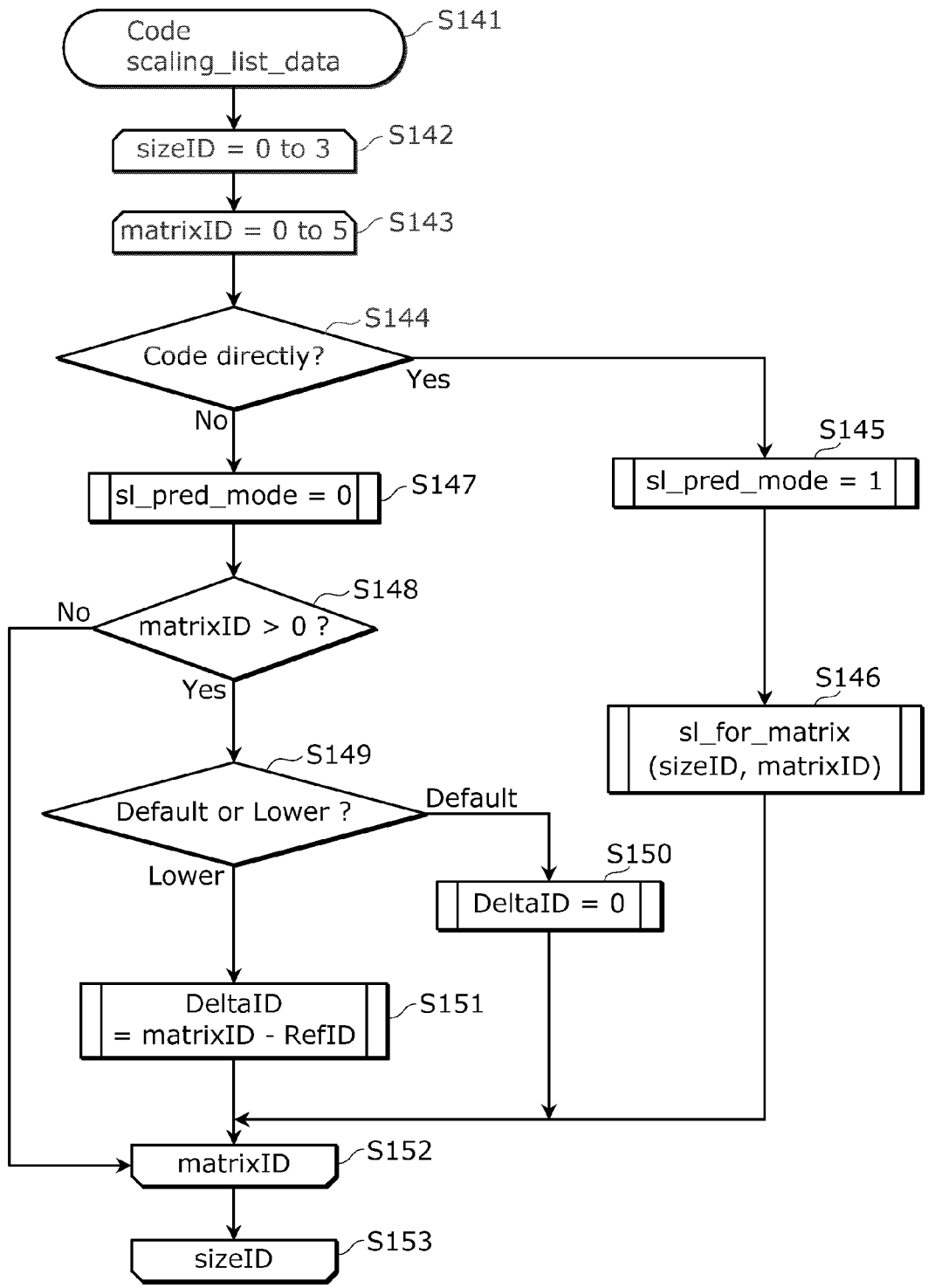
FIG. 3 is a diagram showing a flow of the coding of a quantization matrix according to Embodiment 1.

Next, the flow of the coding of quantization matrices shall be described based on scaling_list_data and with reference to FIG. 3 (S141). The quantization matrix coding unit 102 codes scaling_list_data on a sizeID (identifier of the size of the quantization matrix) basis (S142). Furthermore, for the respective sizes, the quantization matrix coding unit 102 codes the scaling_list_data on a matrixID (identifier of a quantization matrix for one size) basis (S143).

Next, the quantization matrix coding unit 102 codes the quantization matrices for each combination of a sizeID and a matrixID.

Coding of the quantization matrix has three types. The first is the normal operation of coding the contents of a quantization matrix. The second is an operation of instructing the reuse of a quantization matrix (Lower matrix) having the same contents and a lower number than the current matrixID. The third is an operation of instructing the use of a predetermined default quantization matrix (Default matrix). The matrixID of the quantization matrix to be reused is referred to as the RefID.

In the case of the first operation (coding of the contents) (Yes in S144), the quantization matrix coding unit 102 codes sl_pred_mode as 1 (S145), and codes the contents of the quantization matrix (sl_for_matrix) (S146). For example, the contents (sl_for_matrix) of the quantization matrix include the matrix values of the quantization matrix.

In the case of the second or third operation (No in S144), the quantization matrix coding unit 102 codes sl_pred_mode as 0 (S147), and judges whether the matrixID is greater than 0 (S148). When True (Yes in S148), the subsequent processes are different between the second operation and the third operation (S149).

In the case of the second operation (when a reusable quantization matrix is to be referred to) the quantization matrix coding unit 102 calculates DeltaID=matrixID−RefID and codes the DeltaID (S151). In the case of the third operation (when the default quantization matrix is to be referred to) the quantization matrix coding unit 102 codes the DeltaID as 0 (S150).

The quantization matrix coding unit 102 repeats these operations for each matrixID (S152). In addition, the quantization matrix coding unit 102 repeats these operations for each sizeID (S153).

In this embodiment, in the branching step S148, the quantization matrix coding unit 102 codes the DeltaID when matrixID>0, and does not code the DeltaID when matrixID=0. This allows the amount of data to be reduced. Since the amount of code for DeltaID is reduced for each of the sizes, the effect on the reduction of the amount of code is not insignificant. In particular, when images are coded at a low bit rate, the effect on reduction is significant.

[Configuration (Decoding as a Whole)]

Figure 4:
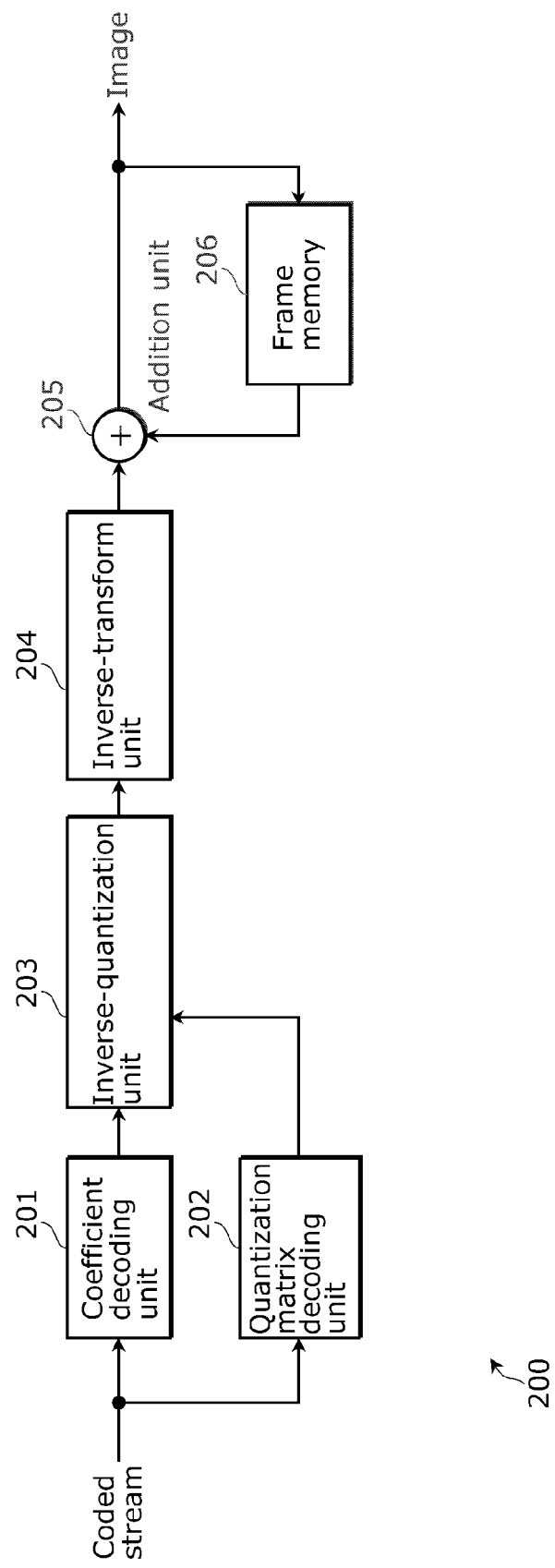
FIG. 4 is a diagram showing a configuration of an image decoding apparatus according to Embodiment 1 and Embodiment 2.

FIG. 4 shows a configuration of an image decoding apparatus in this embodiment. As shown in FIG. 4, an image decoding apparatus 200 in this embodiment includes a coefficient decoding unit 201, a quantization matrix decoding unit 202, an inverse-quantizing unit 203, an inverse-transforming unit 204, an adding unit 205, and a frame memory 206.

[Operation (Decoding as a Whole)]

Figure 5:
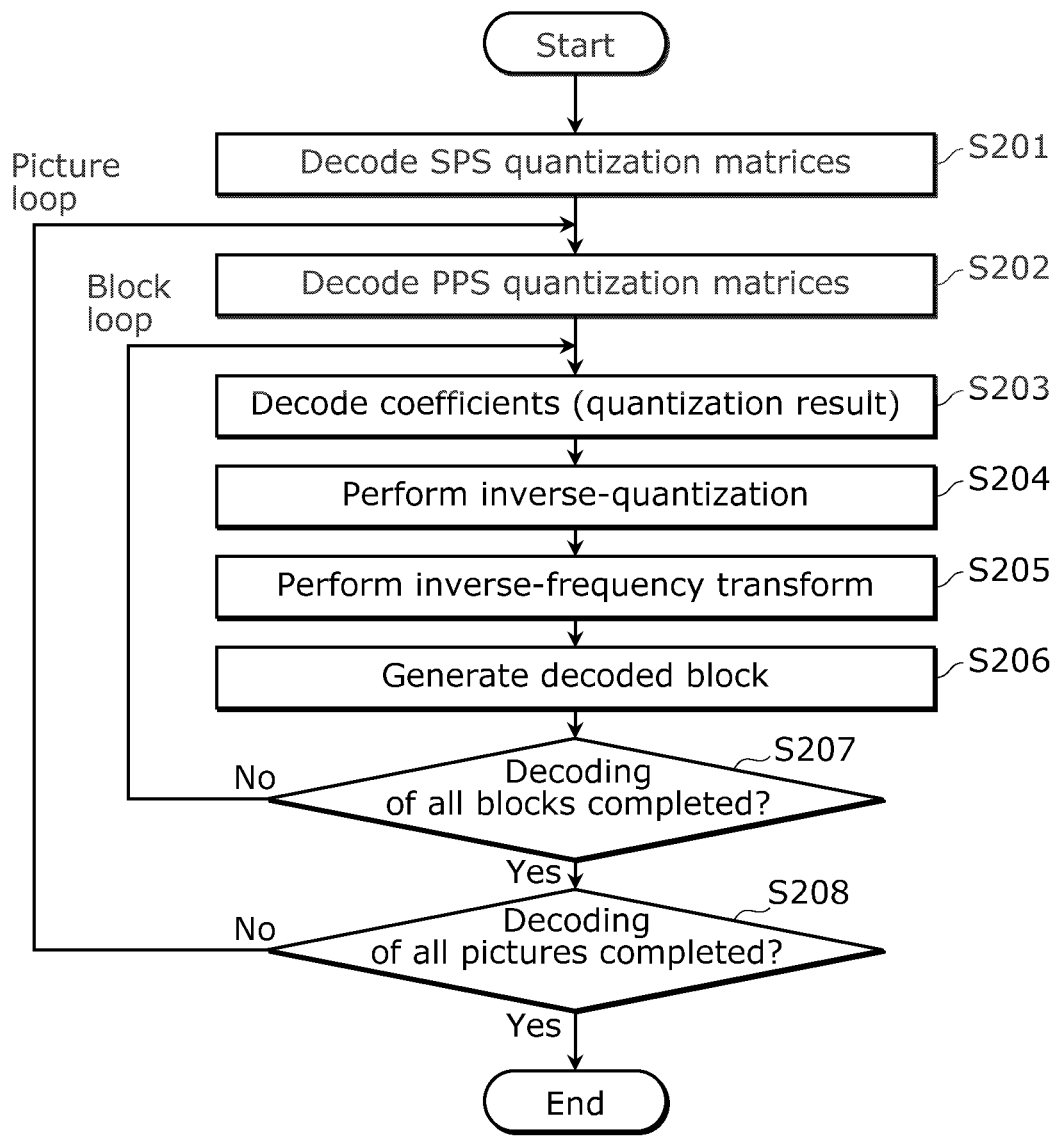
FIG. 5 is a diagram showing an overall flow of the decoding according to Embodiment 1 and Embodiment 2.

Next, the flow of decoding as a whole shall be described with reference to FIG. 5. First, the quantization matrix decoding unit 202 decodes the SPS quantization matrices which are the quantization matrices to be used for a target sequence (S201). Details shall be described later. It should be noted that the subsequent processes for the picture (S202 to S208) are executed for each of the pictures in the sequence, and thus the processes are repeated plural times corresponding to the number of pictures in the sequence.

Next, the quantization matrix decoding unit 202 decodes the PPS quantization matrices which are the quantization matrices to be used for a target picture (S202). Details shall be described later. It should be noted that subsequent processes for a block (S203 to S207) are performed for each block in one picture, and thus the processes are repeated plural times corresponding to the number of blocks in the picture.

Next, the coefficient decoding unit 201 decodes the quantized result from a coded stream (S203). The inverse-quantizing unit 203 inverse-quantizes the quantized result to reconstruct the frequency coefficients or the difference block (S204). At this time, inverse-quantization is performed using the PPS quantization matrices which have been decoded in step S202.

Next, the inverse-transforming unit 204 transforms the frequency coefficients into pixel data to reconstruct the difference block (S205). At this time, a flag indicating whether or not the frequency transform process was skipped for the target block is obtained from the coded stream. When the frequency transform process was skipped, the inverse-frequency transform process is also skipped. It should be noted that the skipping of the transform process is performed only when the transform size is 4×4, and the transform process is performed independently of flags when the transform size is not 4×4.

Next, the adding unit 205 adds up the decoded image (prediction image) stored in the frame memory 206 and the difference block to generate a decoded block, and the decoded block is stored in the frame memory 206 (S206). The size of a block (coding unit) is a variable size. For example, the minimum block size is 8 pixels×8 pixels in the horizontal and vertical directions, and the maximum block size is 64 pixels×64 pixels in the horizontal and vertical directions.

Hereinafter, the quantization matrix coding unit 202 shall be described in detail. The quantization matrix decoding unit 202 decodes the quantization matrices (SPS quantization matrices and the PPS quantization matrices).

[Operation (Decoding of Quantization Matrices)]

Figure 6:
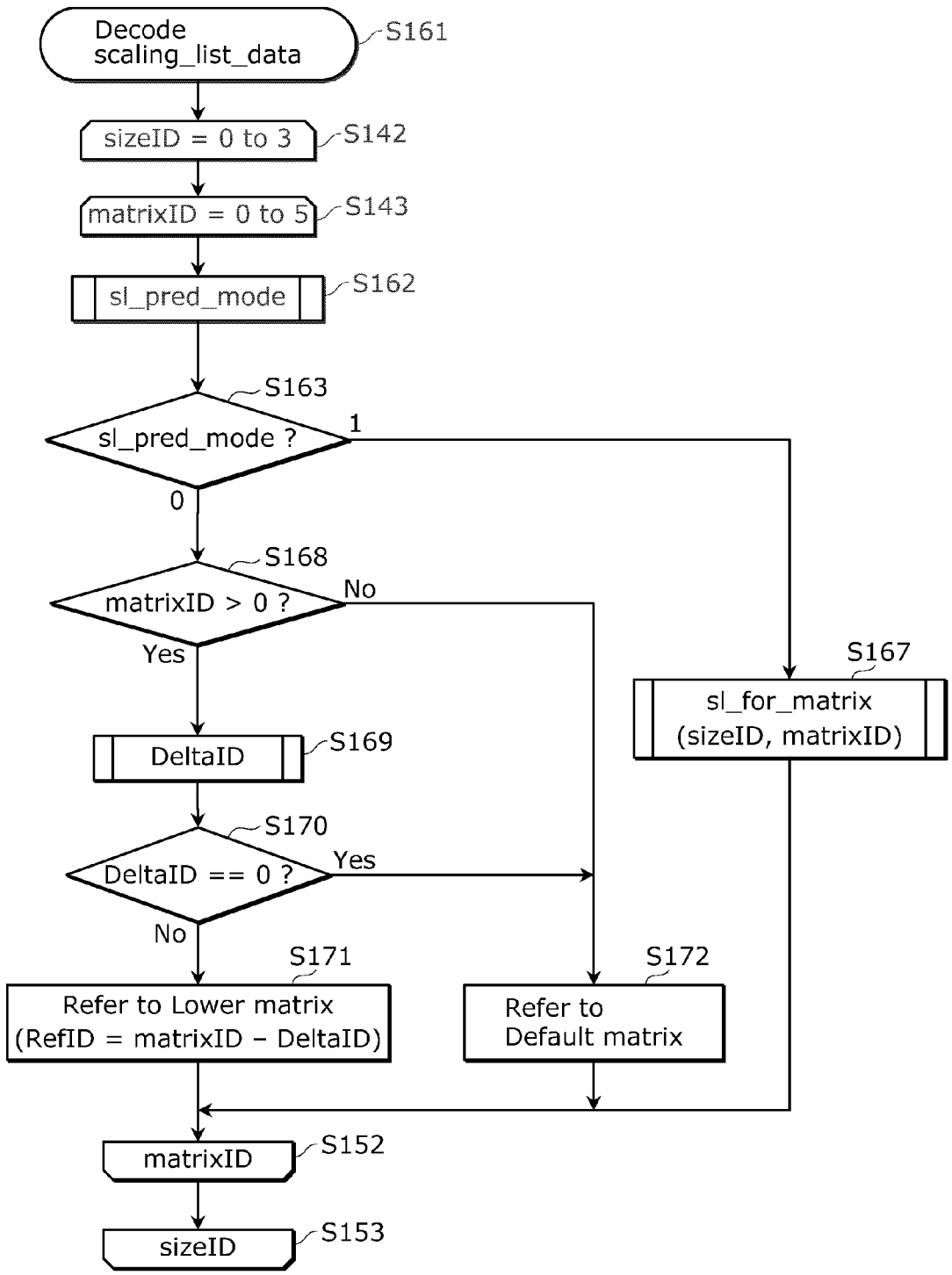
FIG. 6 is a diagram showing a flow of the decoding of a quantization matrix according to Embodiment 1.

Next, the flow of the decoding of quantization matrices shall be described based on scaling_list_data and with reference to FIG. 6 (S161). In the same manner as the coding flow, the quantization matrix decoding unit 202 decodes scaling_list_data on a sizeID (identifier of the size of the quantization matrix) basis (S142). Furthermore, for the respective sizes, the quantization matrix decoding unit 202 decodes the scaling_list_data on a matrixID (identifier of a quantization matrix for one size) basis (S143).

In other words, the quantization matrix decoding unit 202 decodes the quantization matrices for each combination of a sizeID and a matrixID.

Specifically, first, the quantization matrix decoding unit 202 decodes a sl_pred_mode for the target sizeID and matrixID (S162). Then, the quantization matrix decoding unit 202 judges whether the sl_pred_mode indicates 0 or 1 (S163).

When the sl_pred_mode indicates 1, the quantization matrix has been coded according to the above-described first operation. Therefore, the quantization matrix decoding unit 202 directly decodes the contents (sl_for_matrix) of the quantization matrix corresponding to the sizeID and the matrixID (S167). For example, the contents (sl_for_matrix) of the quantization matrix include the matrix values of the quantization matrix.

When the sl_pred_mode indicates 0, the quantization matrix decoding unit 202 judges whether the matrixID is greater than 0 (S168). When matrixID>0 (Yes in S168), the quantization matrix decoding unit 202 decodes the DeltaID (S169). Next, the quantization matrix decoding unit 202 judges whether or not the DeltaID indicates 0 (S170). When the DeltaID indicates 0 (Yes in S170), the quantization matrix decoding unit 202 refers to a predetermined default quantization matrix (S172).

When the DeltaID does not indicate 0 (No in S170), the quantization matrix decoding unit 202 calculates for the RefID using RefID=matrixID−DeltaID. Then, the quantization matrix decoding unit 202 refers to the quantization matrix corresponding to a matrixID that matches the value of the RefID, among already-decoded quantization matrices of the same size (i.e., uses the same content) (S171).

When matrixID=0 (No in S168), the quantization matrix decoding unit 202 refers to the default quantization matrix (S172).

The quantization matrix decoding unit 202 repeats these operations for each matrixID (S152). In addition, the quantization matrix decoding unit 202 repeats these operations for each sizeID (S153).

In this embodiment, in the branching step 168, the quantization matrix decoding unit 202 decodes the DeltaID when matrixID>0, and does not code the DeltaID when matrixID=0. This allows the amount of processing and the amount of data to be reduced.

Embodiment 2

In Embodiment 1, there are cases where, depending on the situation, the coding and decoding of the DeltaID are omitted. However, due to an error in the DeltaID, there is a possibility that the image decoding apparatus will be unable to decode the quantization matrices. This embodiment describes a method and apparatus for resolving this. It should be noted that, in this embodiment, there are cases where, by using the same terms, and so on, as in Embodiment 1, descriptions carried out in Embodiment 1 shall be omitted. Furthermore, configurations and operations in Embodiment 1 which are shown in FIG. 4 and FIG. 5 are also used in this embodiment.

First, the possibility that the image decoding apparatus will be unable to decode the quantization matrices shall be described. Specifically, the problem occurs when DeltaID>matrixID. When DeltaID=0, the default quantization matrix is referred to. When DeltaID=1, an immediately preceding matrix is referred to. When DeltaID=matrixID, the lead matrix is referred to. However, when DeltaID>matrixID, operation is indefinite.

Figure 7:
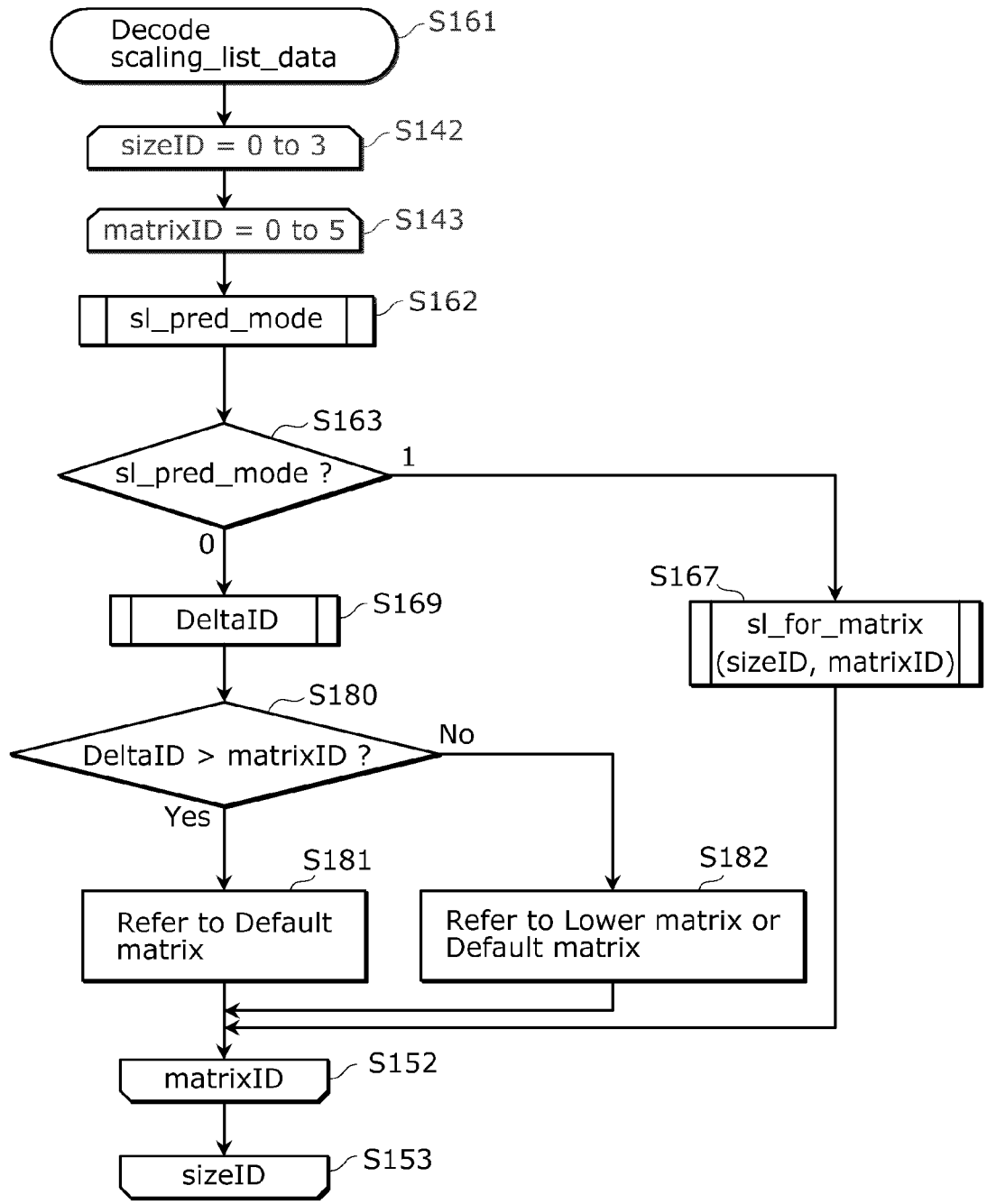
FIG. 7 is a diagram showing a first example of a flow of the decoding of a quantization matrix according to Embodiment 2.

This situation can arise, for example, when an error occurs in the transmission path or when the total amount of data is reduced by coding the DeltaID using a negative number. In such cases, each quantization matrix is decoded with reference to a default quantization matrix, as shown in FIG. 7. This is specifically described below.

The quantization matrix decoding unit 202 decodes the sl_pred_mode for the target sizeID and matrixID (S161, S142, and S143) (S162). When the sl_pred_mode indicates 1, the quantization matrix decoding unit 202 directly decodes the contents (sl_for_matrix) of the quantization matrix (S167). For example, the contents (sl_for_matrix) of the quantization matrix include the matrix values of the quantization matrix.

When the sl_pred_mode indicates 0, the quantization matrix decoding unit 202 decodes the DeltaID (S169), and performs a size comparison between the DeltaID and the matrixID (S180). When DeltaID>matrixID (Yes in S180), the quantization matrix decoding unit 202 refers to the default quantization matrix (S181).

When DeltaID≤matrixID (No in S180), the quantization matrix decoding unit 202 refers to the default quantization matrix (Default matrix) or the quantization matrix having a lower number (Lower matrix) (S182).

For example, when DeltaID=0, the quantization matrix decoding unit 202 refers to the default quantization matrix. When DeltaID≤matrixID, the quantization matrix decoding unit 202 refers to the RefID (=matrixID−DeltaID) quantization matrix (S182).

It should be noted that, when the transform skip enable flag indicating whether or not skipping of the transform process is permitted indicates True, a flat quantization matrix of a 4×4 transform size is used. A flat quantization matrix is a quantization matrix in which a quantization step of the same value is set for any frequency position.

Alternatively, when DeltaID>matrixID, the default quantization matrix may be used regardless of the value of the transform skip enable flag. Alternatively, when DeltaID>matrixID, the flat quantization matrix may be used regardless of the value of the transform skip enable flag.

Figure 8:
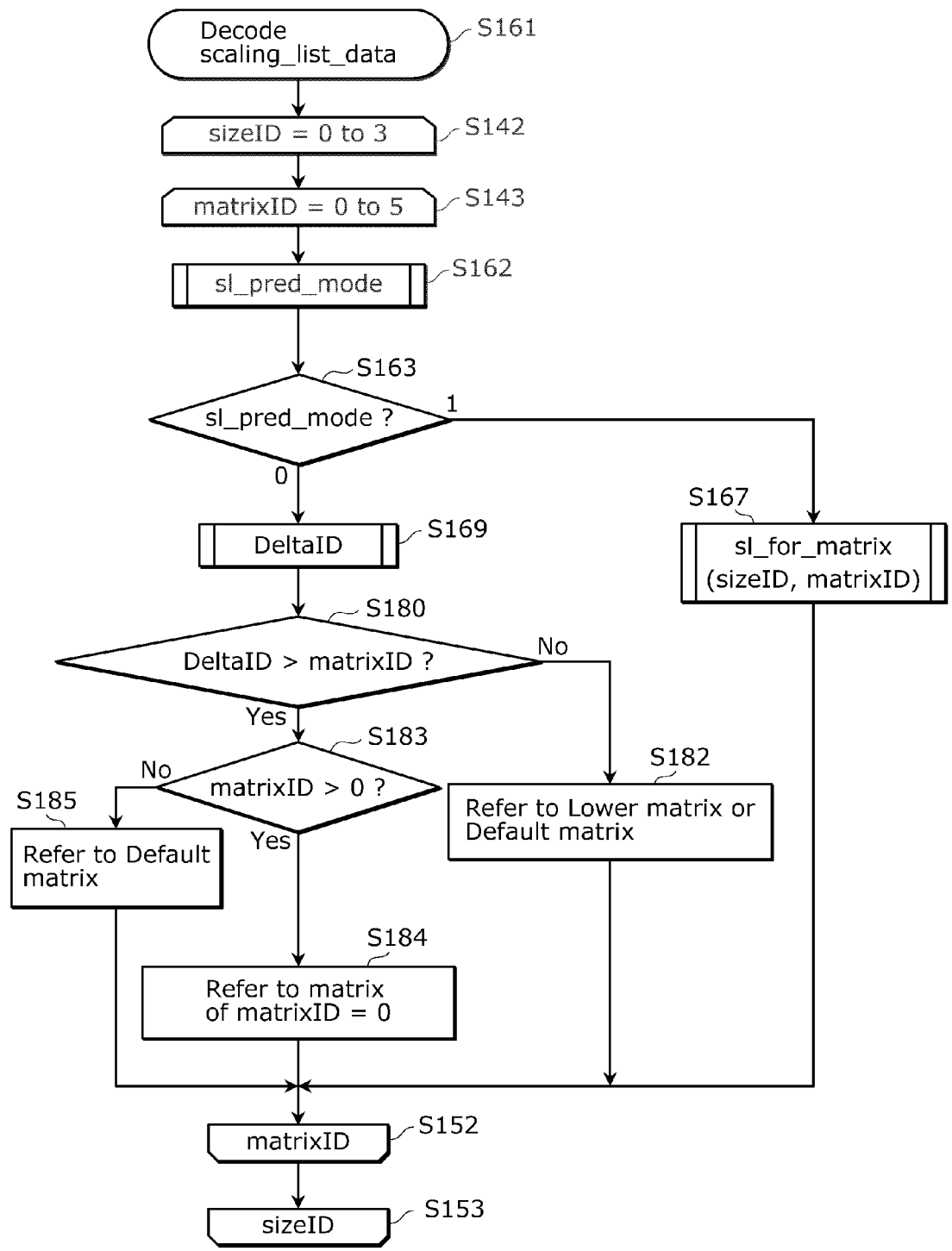
FIG. 8 is a diagram showing a second example of a flow of the decoding of a quantization matrix according to Embodiment 2.

Furthermore, as shown in FIG. 8, the operation may be changed depending on whether or not the matrixID is greater than 0. In FIG. 8, steps S183 to S185 are added in place of step S181 in FIG. 7. Specifically, when matrixID>0 (Yes in S183), the quantization matrix decoding unit 202 refers to the quantization matrix corresponding to matrixID=0 (luma in intra prediction) (S184).

The quantization matrix corresponding to chroma (chroma signal) is often adjusted to be equivalent to the quantization matrix corresponding to luma (luma signal). Therefore, a relatively suitable quantization matrix is referred to.

When matrixID=0 in the judgment in step S183, the quantization matrix decoding unit 202 refers to the default quantization matrix (S185).

Figure 9:
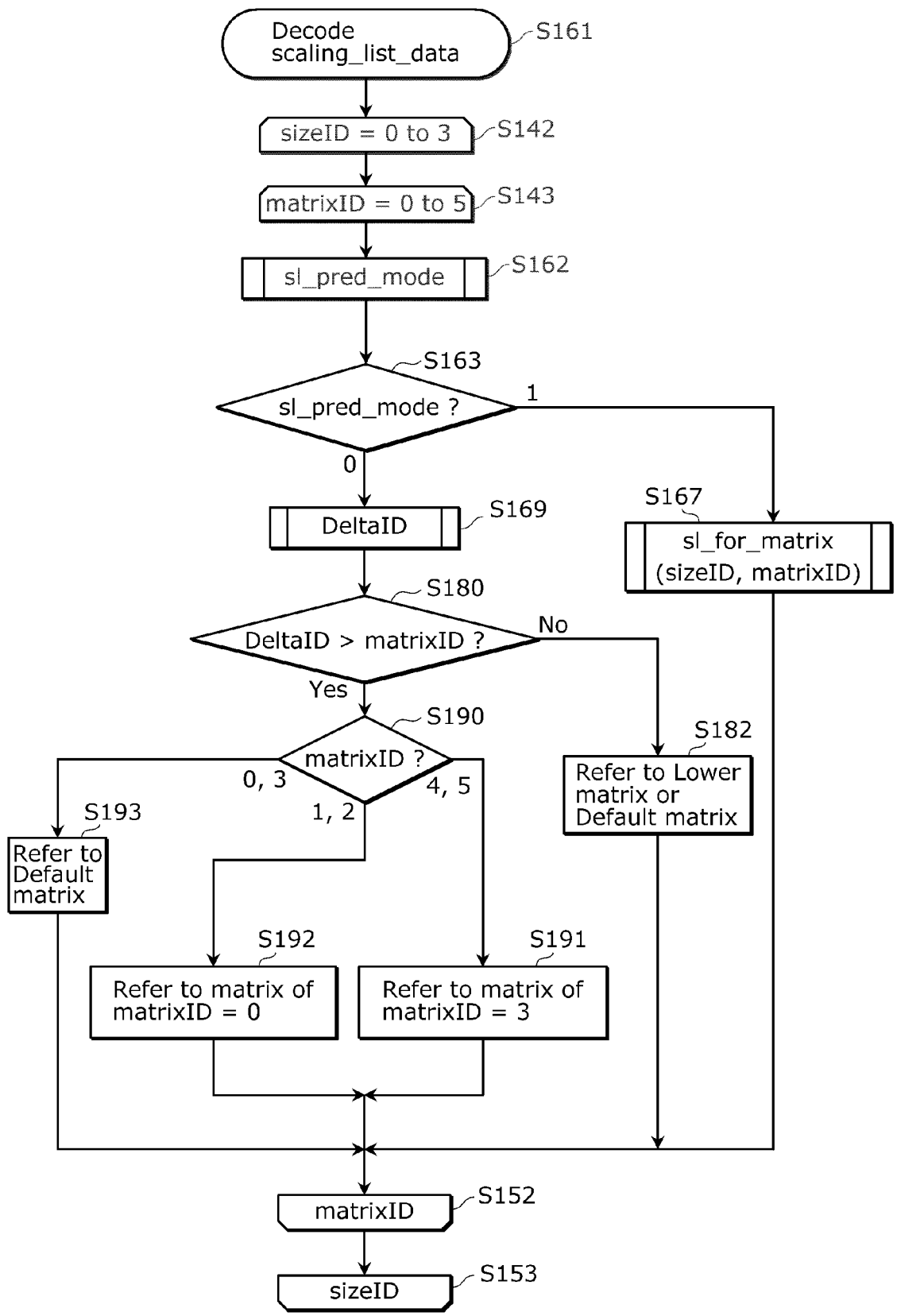
FIG. 9 is a diagram showing a third example of a flow of the decoding of a quantization matrix according to Embodiment 2.

Alternatively, the difference in prediction modes may be taken into consideration, as shown in FIG. 9. In FIG. 9, steps S190 to S193 are added in place of step S181 in FIG. 7. For example, when matrixID=4 or 5 (chroma signal in inter prediction), the quantization matrix decoding unit 202 refers to the quantization matrix of matrixID=3 (luma signal in inter prediction).

In other words, the process differs depending on the matrixID (S190). As described above, when matrixID=4 or 5, the quantization matrix decoding unit 202 refers to the quantization matrix of matrixID=3 (S191). When matrixID=1 or 2, the quantization matrix decoding unit 202 refers to the quantization matrix of matrixID=0 (S192). In other cases, the quantization matrix decoding unit 202 refers to the default quantization matrix (S193).

Alternatively, in the case of chroma Cr, the quantization matrix decoding unit 202 may refer to the chroma Cb. Specifically, when matrixID=6 (chroma Cr in inter prediction), the quantization matrix decoding unit 202 may refer to the quantization matrix of matrixID=5 (chroma Cb in inter prediction). Furthermore, when matrixID=2 (chroma Cr in intra prediction), the quantization matrix decoding unit 202 may refer to the quantization matrix of matrixID=1 (chroma Cb in intra prediction).

It should be noted that, in FIG. 7 and FIG. 8, the quantization matrix decoding unit 202 may calculate RefID=matrixID−DeltaID without performing the judgment for whether DeltaID>matrixID, and may overwrite the RefID with 0 when the RefID is a negative number.

Furthermore, in FIG. 7, FIG. 8, and FIG. 9, the judgment for whether DeltaID>matrixID is performed (S180). However, operation is also indefinite when DeltaID<0. Therefore, in step S180, judgment for whether DeltaID>matrixID or whether DeltaID<0 may be performed. Then, when DeltaID>matrixID or DeltaID<0, the error control (S181, S183 to S185, and S190 to S193) shown in FIG. 7, FIG. 8, and FIG. 9 may be performed.

Furthermore, although the quantization matrix decoding unit 202 is indicated as the subject of the operations in the foregoing description, the subject of the operations is not limited to the quantization matrix decoding unit 202. For example, the inverse-quantizing unit 203 may refer to the quantizing matrix without the quantization matrix decoding unit 202 referring to the quantization matrix.

Furthermore, although the size (transform size) of quantization matrices are typically 32×32 maximum and 4×4 minimum, the size may be greater than such maximum size or less than such minimum size. Furthermore, the size (transform size) of quantization matrices may be a fixed size.

Figure 10:
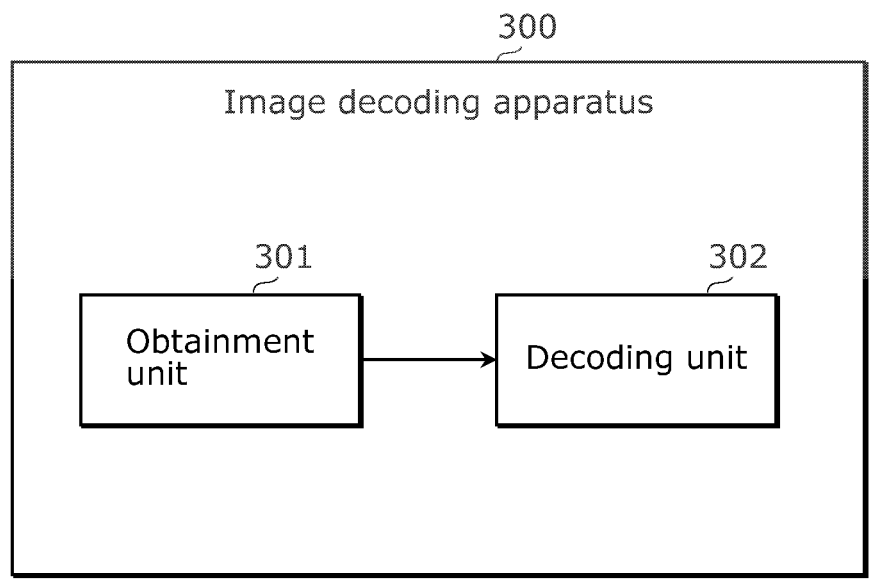
FIG. 10 is a diagram showing a characteristic configuration of an image decoding apparatus according to Embodiment 2.
Figure 11:
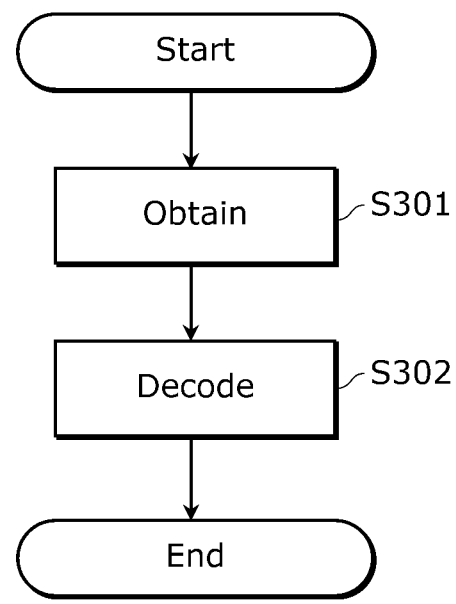
FIG. 11 is a diagram showing a characteristic operational flow for an image decoding apparatus according to Embodiment 2.

FIG. 10 and FIG. 11 show a characteristic configuration and operation of an image decoding apparatus according to the above-described examples. The above-described examples may be summed up in the manner described below.

FIG. 10 shows a characteristic configuration of the image decoding apparatus according to the above-described examples. An image decoding apparatus 300 shown in FIG. 10 includes an obtaining unit 301 and a decoding unit 302. The obtaining unit 301 in FIG. 10 mainly corresponds to the quantization matrix decoding unit 202 in FIG. 4, and the decoding unit 302 in FIG. 10 mainly corresponds to the inverse-quantizing unit 203 in FIG. 4.

FIG. 11 shows the characteristic operations of the image decoding apparatus 300 shown in FIG. 10. The image decoding apparatus 300 performs the following operation.

First, the obtaining unit 301 obtains setting information for setting a first quantization matrix used in decoding an image (S301). The decoding unit 302 decodes the coefficients of the image using the first quantization matrix which has been set according to the setting information (S302).

Here, when specifying information for specifying a second quantization matrix is included in the setting information and the second quantization matrix specified by the specifying information is referable, the decoding unit 302 sets the second quantization matrix as the first quantization matrix. On the other hand, when specifying information is included in the setting information and the second quantization matrix specified by the specifying information is non-referable, the decoding unit 302 sets a referable third quantization matrix as the first quantization matrix.

Accordingly, when a quantization matrix is non-referable, another quantization matrix, which is referable, is used. Therefore, error tolerance in decoding of an image coded with a high coding efficiency improves.

For example, the obtaining unit 301 may obtain setting information for setting plural quantization matrices by assigning an order number to each of the quantization matrices. The plural quantization matrices may respectively correspond to plural combinations of prediction modes, which include the intra prediction mode and the inter prediction mode, and plural components, which include the luma component and the chroma component. The first quantization matrix and the coefficients of an image may correspond to the combination of a first mode of the plural modes and a first component of the plural components.

Furthermore, for example, the third quantization matrix may be used when the order number of the second quantization matrix is lower than the leading order number for the plural quantization matrices. Furthermore, for example, the third quantization matrix may be used when the order number of the second quantization matrix is higher than the order number of the first quantization matrix.

Furthermore, for example, the specifying information may indicate a difference obtained by subtracting the order number of the second quantization matrix from the order number of the first quantization matrix. The third quantization matrix may be used when the difference indicated by the specifying information is larger than the order number of the first quantization matrix. The third quantization matrix may be used when the difference indicated by the specifying information is a negative number.

The third quantization matrix may be a default quantization matrix. The third quantization matrix may be a quantization matrix having an order number lower than the order number of the first quantization matrix. The third quantization matrix may be the quantization matrix which is the first in order number. The default quantization matrix may be used when the order number of the first quantization matrix is the first.

When the first quantization matrix corresponds to the combination of the first prediction mode and the chroma component, the quantization matrix corresponding to the combination of the first prediction mode and the luma component may be used. The default quantization matrix may be used when the first quantization matrix corresponds to the combination of the first prediction mode and the luma component.

The first quantization matrix may be used when the matrix values of the first quantization matrix are included in the setting information.

The setting information corresponds to sl_pred_mode, DeltaID, sl_for_matrix, or scaling_list_data, etc. Here, scaling_list_data includes the sl_pred_mode, DeltaID, and sl_for_matrix. The specifying information corresponds to the DeltaID, RefID, matrixID, or the like.

The above-described operations may be combined arbitrarily. Furthermore, various modifications are possible based on the above-described examples in the embodiments.

In each of the above-described embodiments, the respective function blocks may be implemented using an MPU, a memory, and the like. Furthermore, the processes performed by the respective function blocks may be implemented through software (e.g., a program), and such software may be recorded on a recording medium such as a ROM, or the like. In addition, such software may be distributed by downloading, and so on, and may also be distributed by being recorded on a recording medium such as a CD-ROM, or the like. It should be noted that the respective function blocks may be implemented through hardware (e.g., a dedicated circuit).

In other words, in each of the above-described embodiments, the respective constituent elements may be configured using dedicated hardware, and may also be implemented by executing software programs suited to the respective constituent elements. The respective constituent elements may be implemented by a program execution unit such as a CPU or a processor reading and executing a software program recorded on a recording medium such as a hard disk or semiconductor memory.

Stated differently, the image coding apparatus and the image decoding apparatus each include processing circuitry and storage that is electrically connected to the processing circuitry (i.e., accessible to the processing circuitry). The processing circuitry includes at least one of dedicated hardware and a program executing unit, and executes processes using the storage. The storage holds, at least temporarily, at least one of the first quantization matrix which is set, and the second quantization matrix and third quantization matrix which are referred to. The processing circuitry performs coding using these matrices. Furthermore, when the processing circuitry includes the program executing unit, the storage stores the software program executed by the program executing unit.

Here, software for implementing the image decoding apparatus, and so on, in each of the above-described embodiments is a program such as that described below.

Specifically, the program causes a computer to execute an image decoding method which is an image decoding method for decoding an image, the image decoding method may include: obtaining setting information for setting a first quantization matrix to be used in the decoding of the image; and decoding coefficients of the image, using the first quantization matrix set according to the setting information, wherein, in the decoding: when the setting information includes specifying information for specifying a second quantization matrix and the second quantization matrix specified by the specifying information is referable, the second quantization matrix may be set as the first quantization matrix; and when the setting information includes the specifying information and the second quantization matrix specified by the specifying information is not referable, a third quantization matrix which is referable may be set as the first quantization matrix.

Furthermore, each of the constituent elements may be a circuit. These circuits may, as a whole, constitute a single circuit, or may each be an independent circuit. Furthermore, each of the constituent elements may be implemented by a general-purpose processor or by a dedicated processor.

Furthermore, the processes executed by a particular processing unit may be executed by another processing unit. Furthermore, the sequence in which processes are executed may be changed, and plural processes may be executed in parallel. Furthermore, an image coding and decoding apparatus may include the image coding apparatus and the image decoding apparatus.

Furthermore, the processes described in each of the embodiments may be implemented by integrated processing using a single apparatus (system), or may be implemented by distributed processing using plural apparatuses. Furthermore, the computer for executing the above-described program may be a single computer or plural computers. In other words, the computers for executing the above-described program may perform integrated processing or distributed processing.

Although the respective exemplary embodiments have been described, the claims of the present application are not limited to these embodiments. Those skilled in the art will readily appreciate that various modifications may be carried out on the respective embodiments, and other embodiments may be obtained by arbitrarily combining the constituent elements of the respective embodiments, without departing from the novel teachings and advantages of the subject matter described in the appended claims. Therefore, such modifications and other embodiments are included in the present disclosure.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 12:
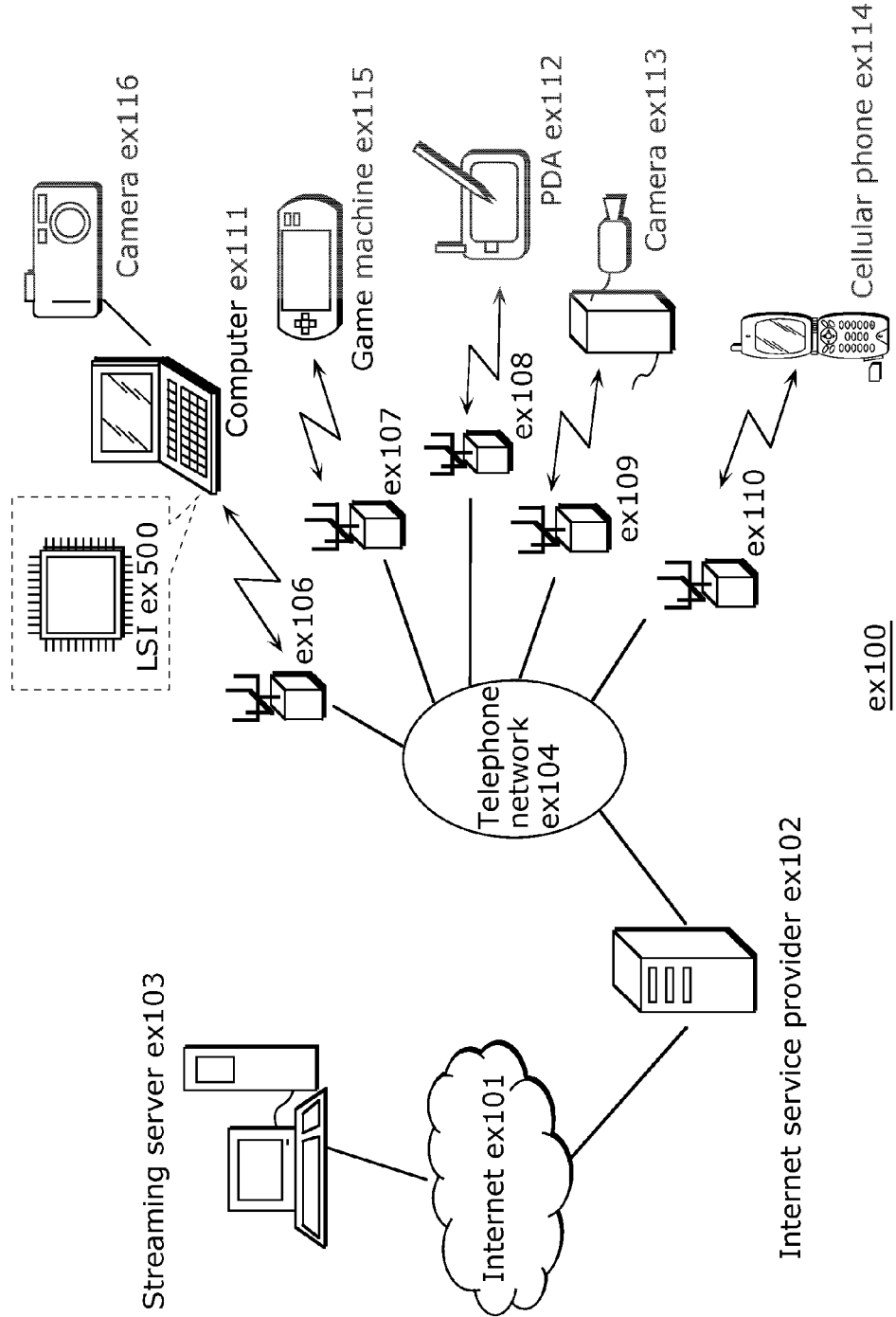
FIG. 12 is a diagram of an overall configuration of a content providing system for implementing content distribution services.

FIG. 12 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 12, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 13:
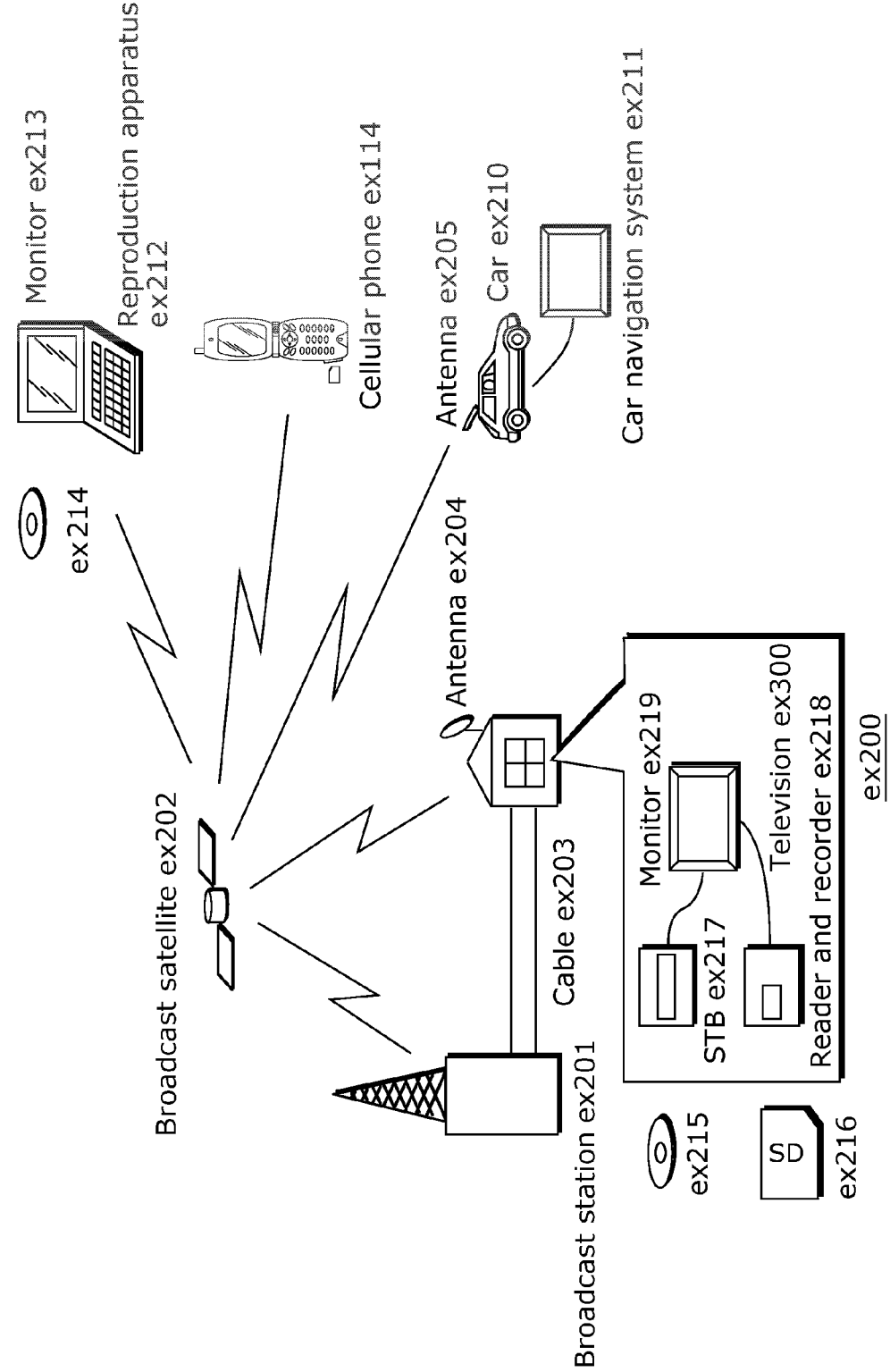
FIG. 13 is a diagram of an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 13. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 14:
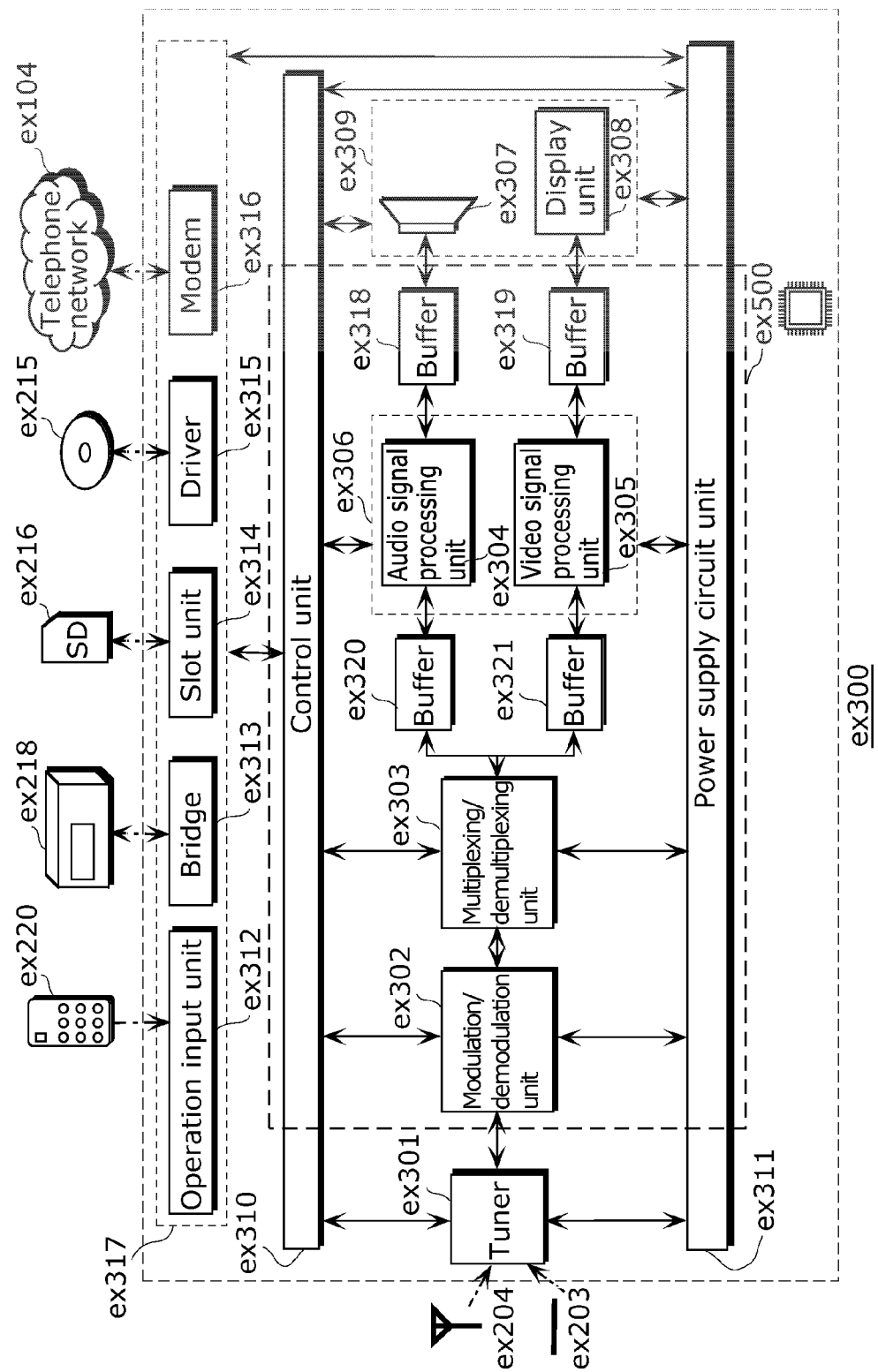
FIG. 14 is a block diagram showing an example of a configuration of a television.

FIG. 14 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 15:
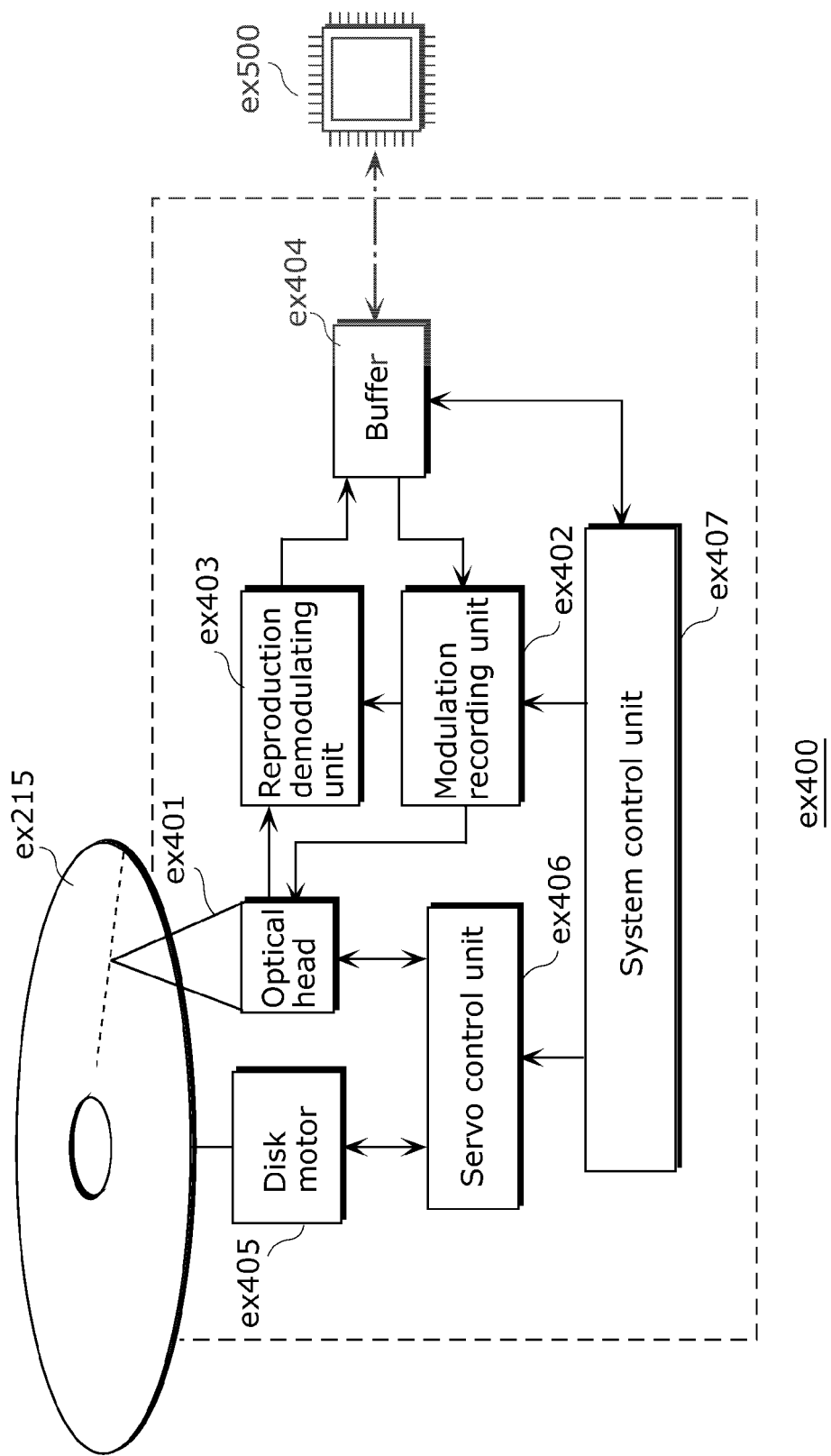
FIG. 15 is a block diagram showing an example of a configuration of an information reproducing/recording unit that reads and writes information from or on a recording medium which is an optical disk.

As an example, FIG. 15 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 16:
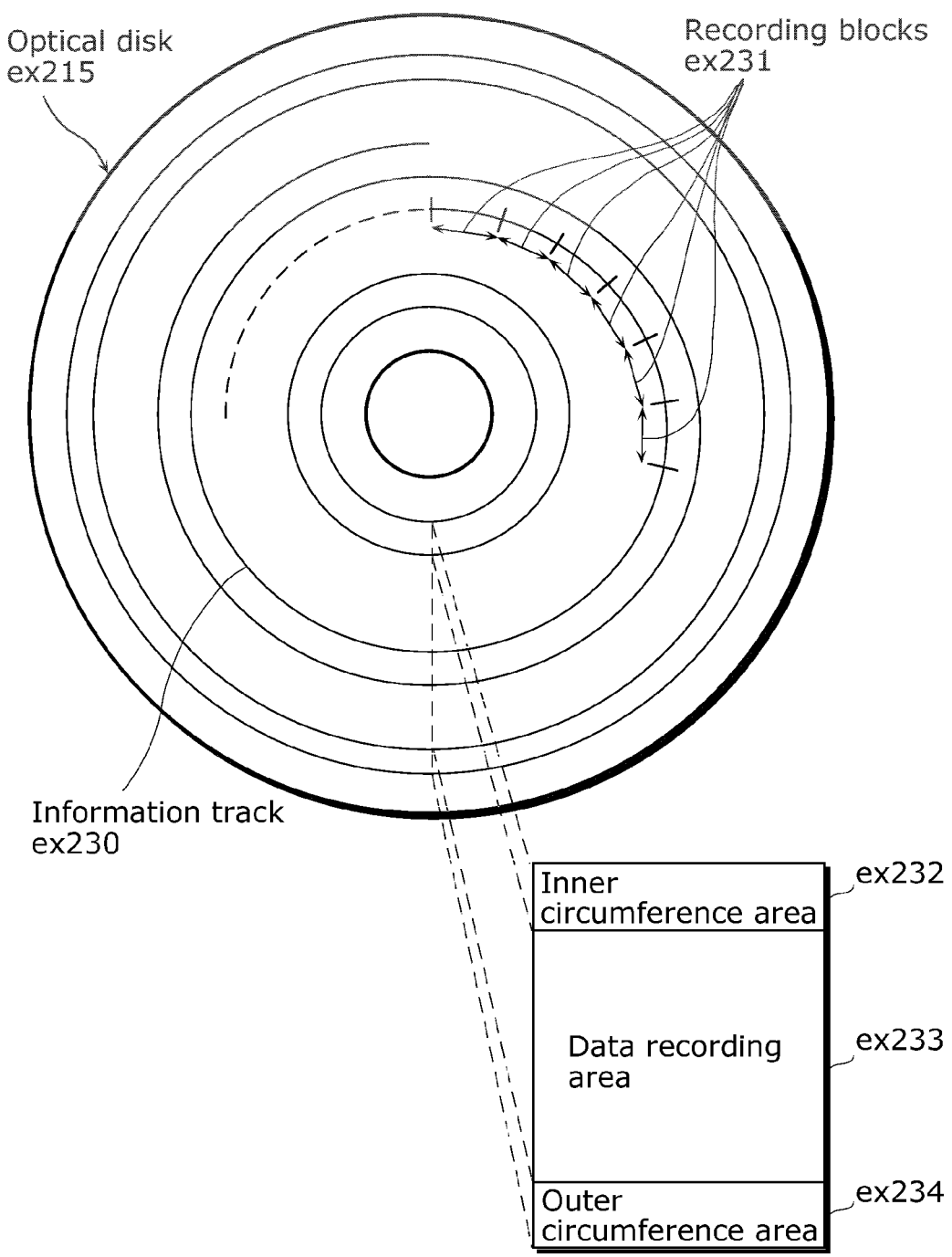
FIG. 16 is a diagram showing an example of a configuration of a recording medium that is an optical disk.

FIG. 16 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 14. The same will be true for the configuration of the computer ex111, the cellular phone ex114, and others.

Figure 17A:
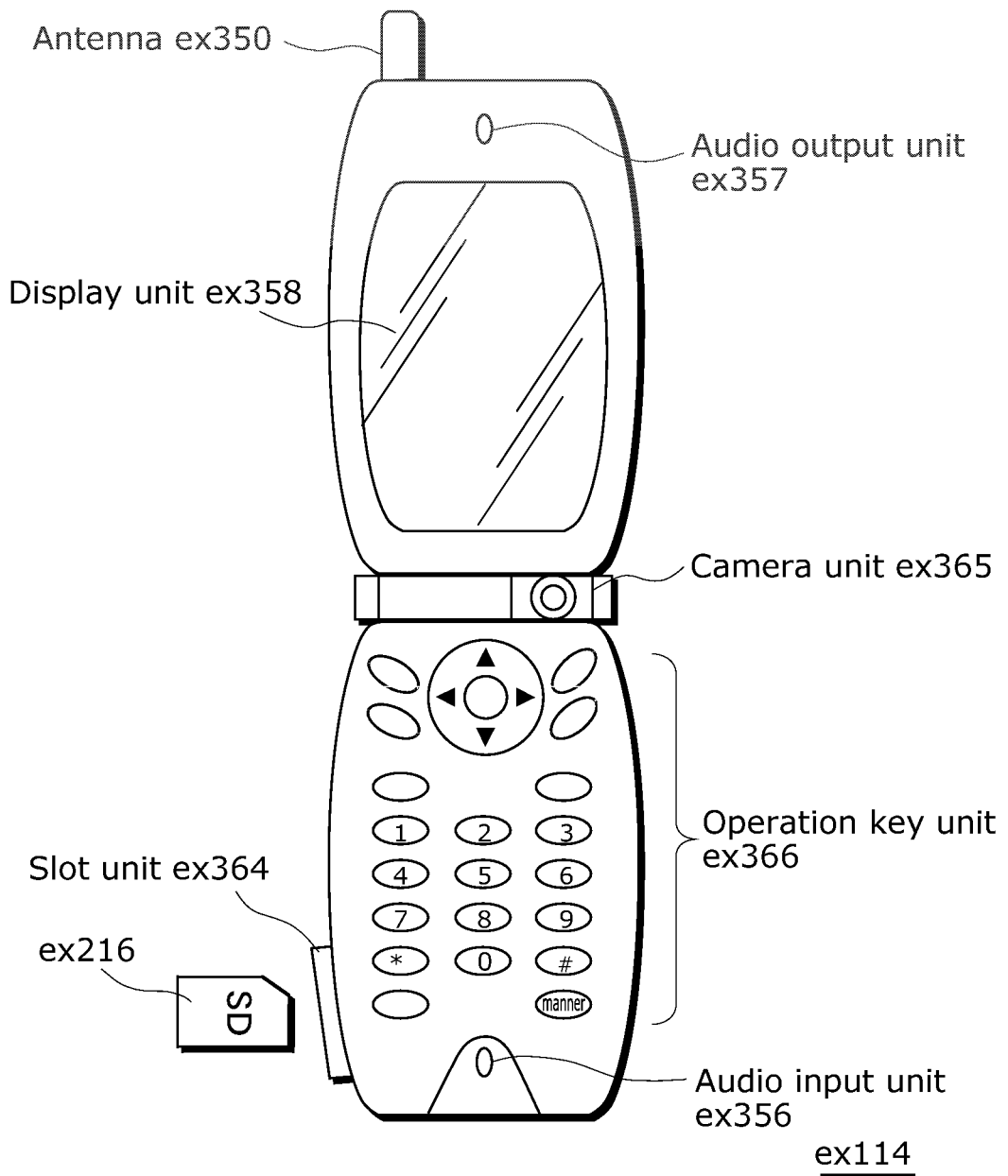
FIG. 17A is a diagram showing an example of a cellular phone.

FIG. 17A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 17B:
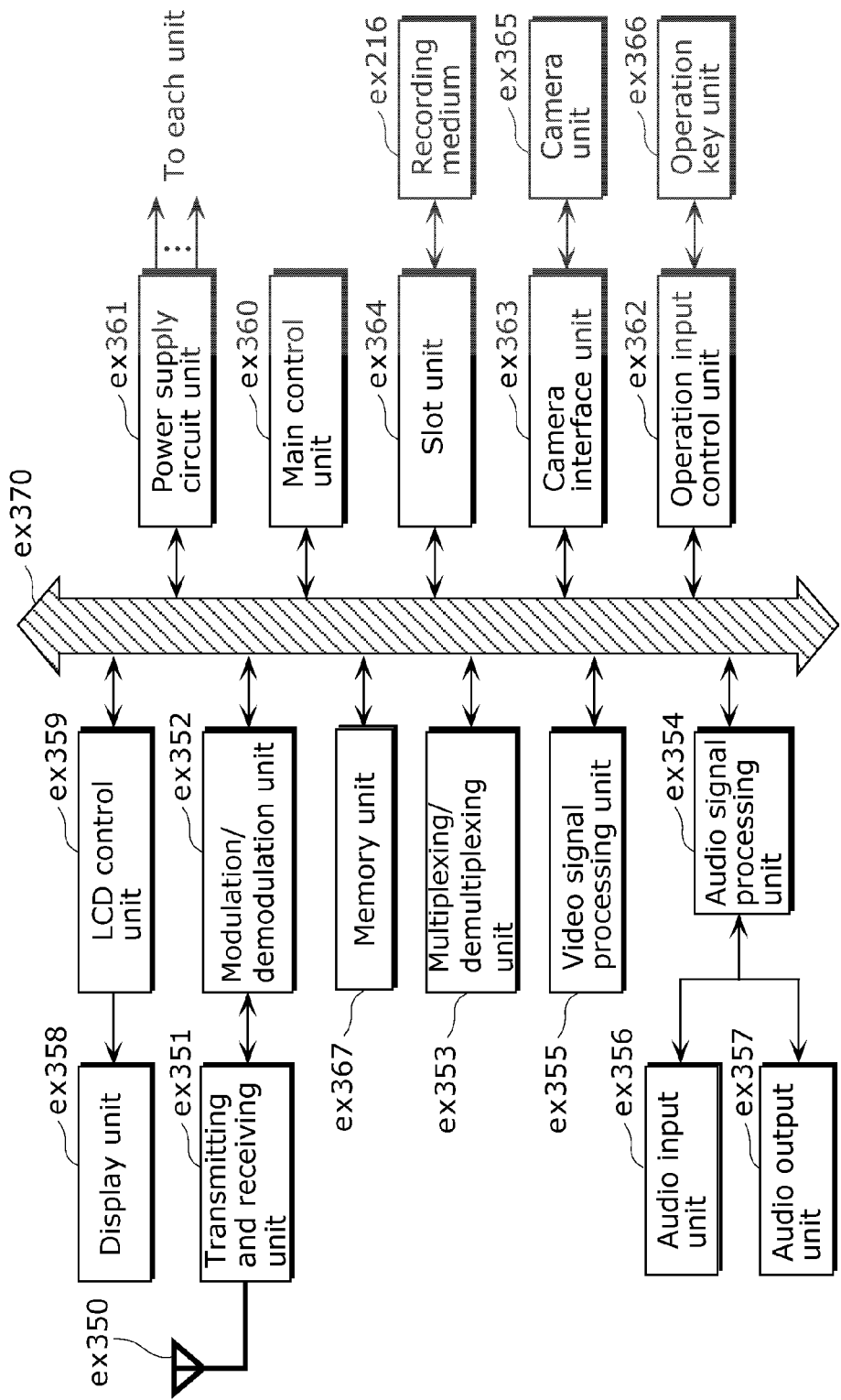
FIG. 17B is a block diagram showing an example of a configuration of a cellular phone.

Next, an example of a configuration of the cellular phone ex114 will be described with reference to FIG. 17B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, it is possible for a terminal such as the cellular phone ex114 to have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since the standard to which each of the plurality of the video data to be decoded conforms cannot be detected, an appropriate decoding method cannot be selected.

In view of this, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 18 illustrates a structure of the multiplexed data. As illustrated in FIG. 18, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 19:
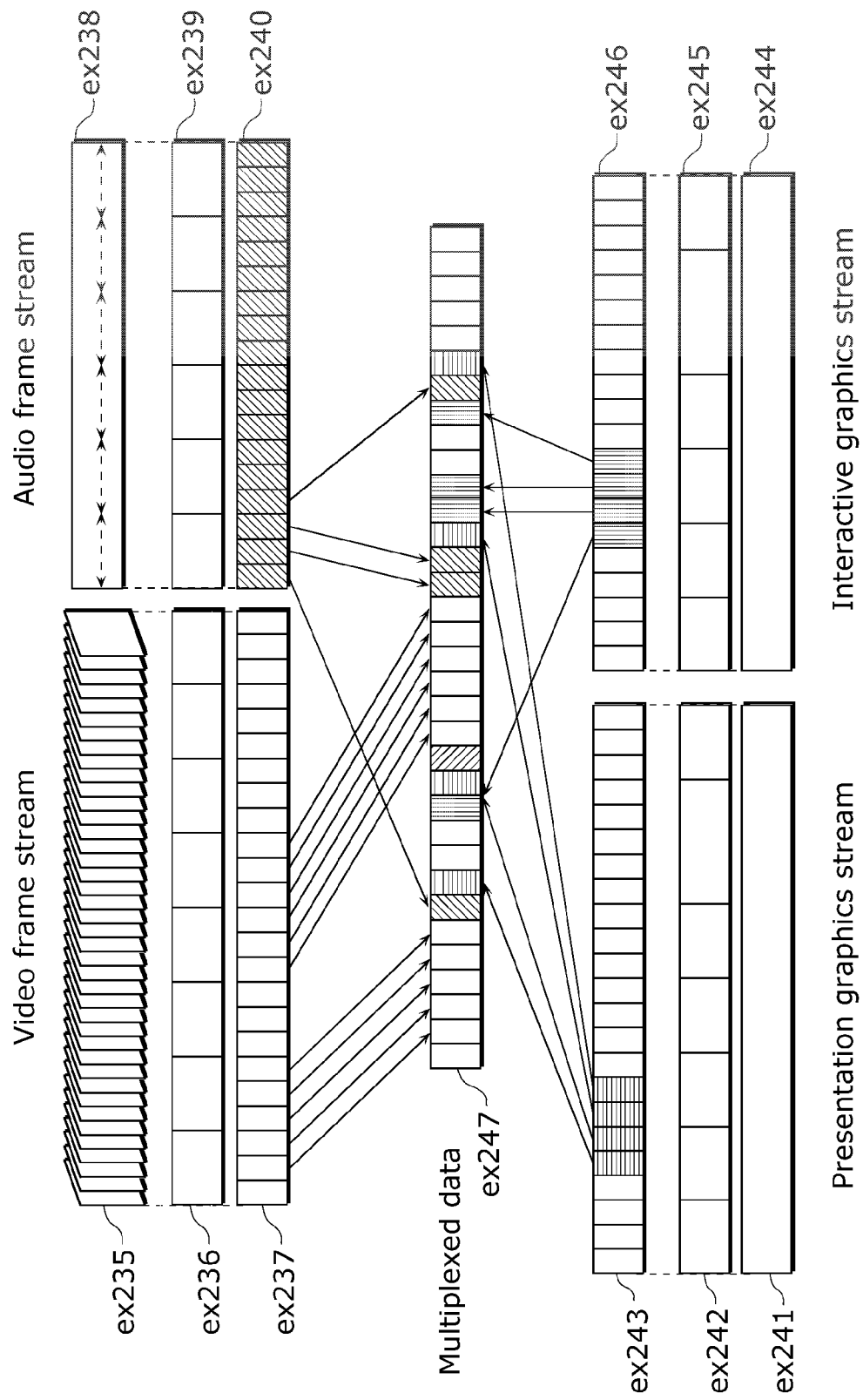
FIG. 19 is a diagram schematically illustrating how each stream is multiplexed in multiplexed data.

FIG. 19 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 20:
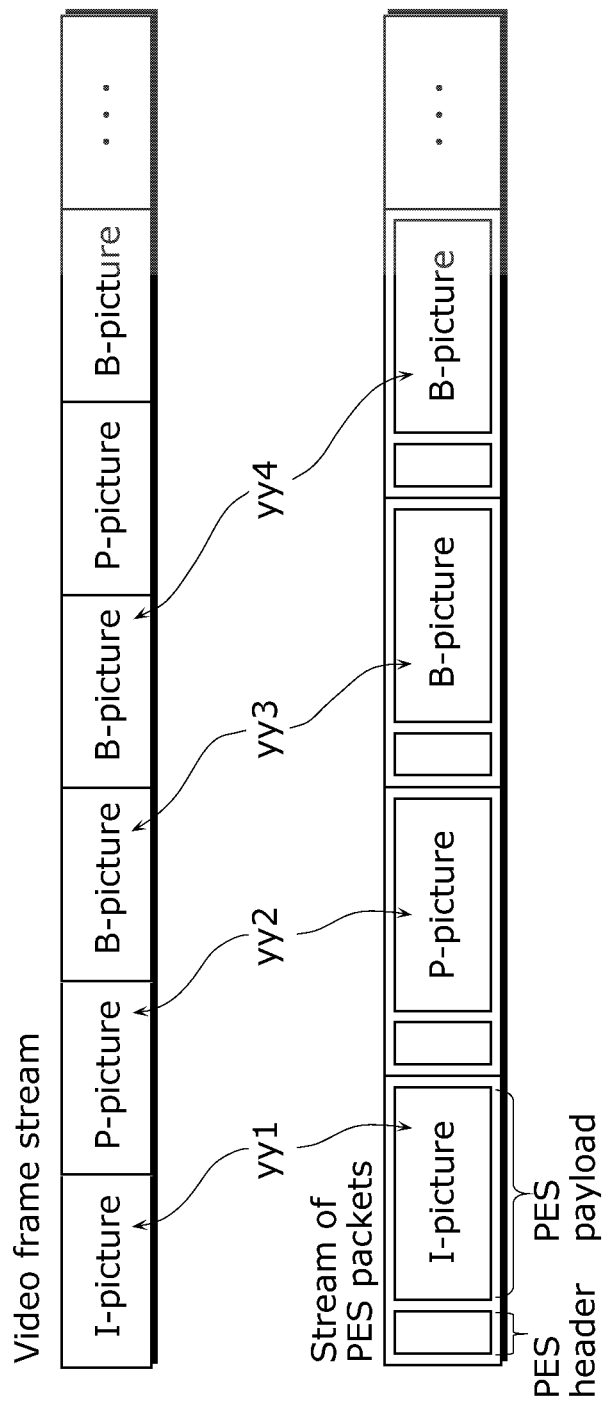
FIG. 20 is a diagram showing in more detail how a video stream is stored in a stream of PES packets.

FIG. 20 illustrates how a video stream is stored in a stream of PES packets in more detail. The first bar in FIG. 20 shows a video frame stream in a video stream. The second bar shows the stream of PES packets. As indicated by arrows denoted as yy1, yy2, yy3, and yy4 in FIG. 20, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 21:
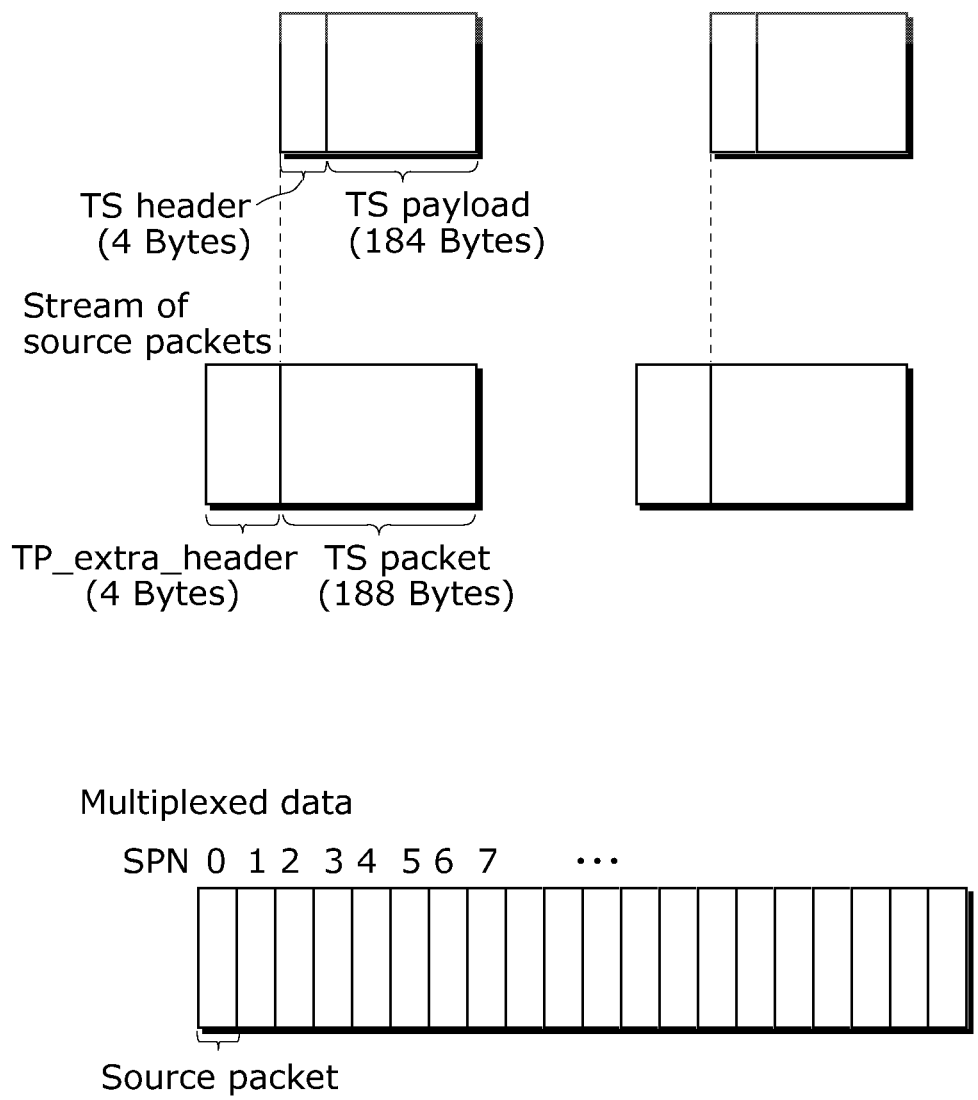
FIG. 21 is a diagram showing a structure of TS packets and source packets in the multiplexed data.

FIG. 21 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 21. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 22:
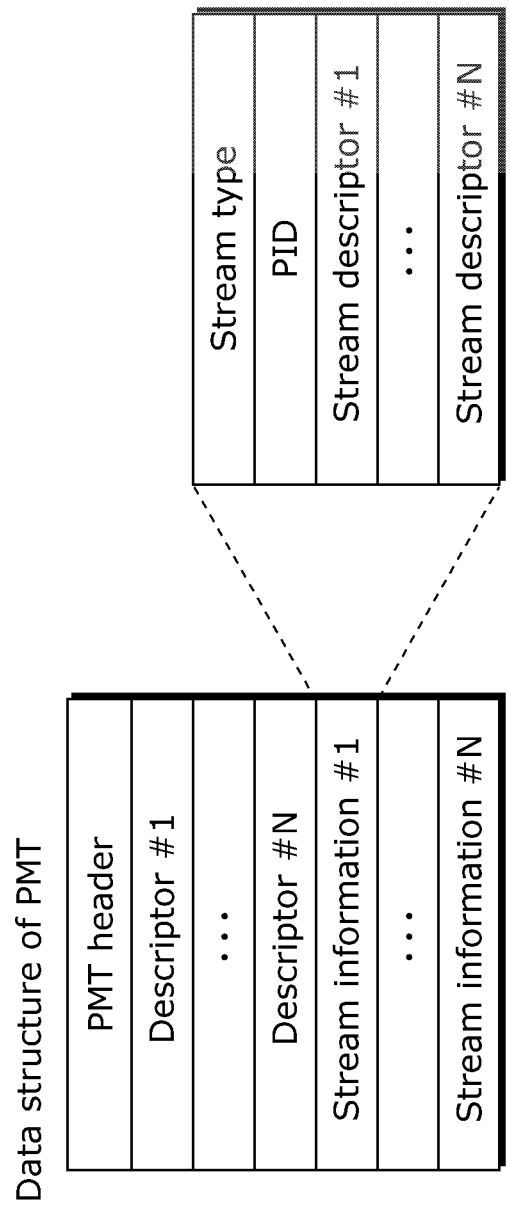
FIG. 22 is a diagram illustrating a data structure of a PMT.

FIG. 22 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 23:
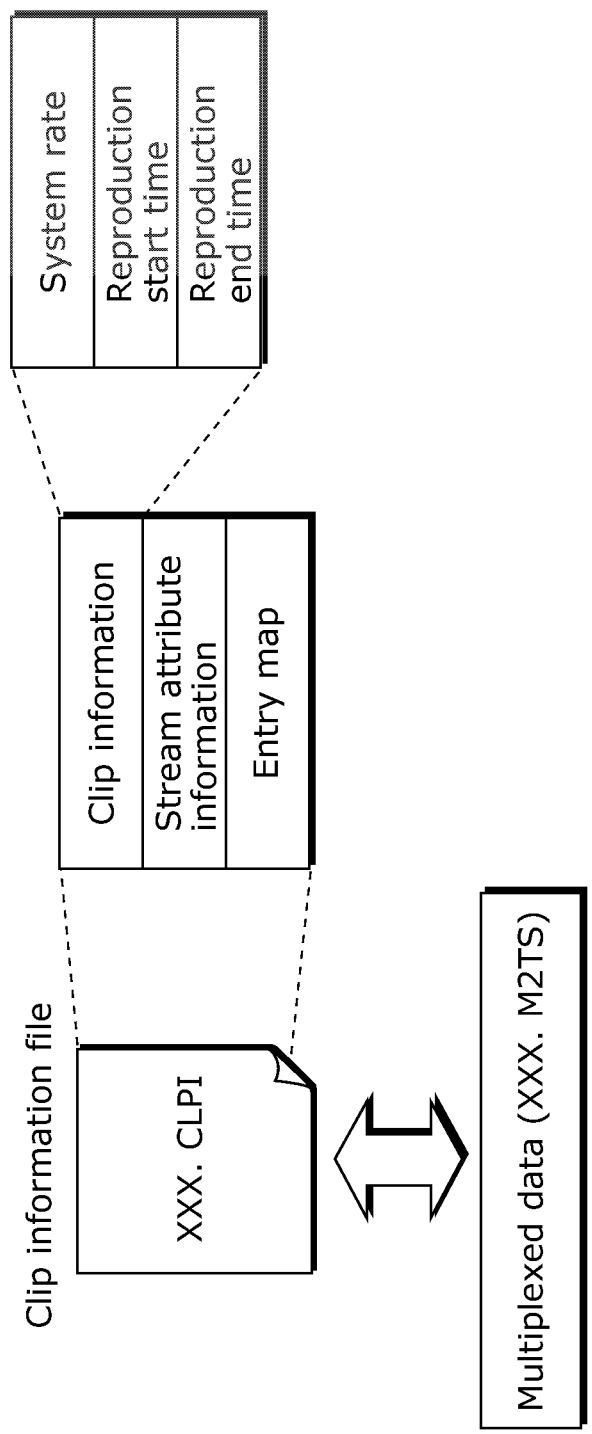
FIG. 23 is a diagram showing an internal structure of multiplexed data information.

Each of the multiplexed data information files is management information of the multiplexed data as shown in FIG. 23. The multiplexed data information files are in one to one correspondence with the multiplexed data, and each of the files includes multiplexed data information, stream attribute information, and an entry map.

As illustrated in FIG. 23, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 24:
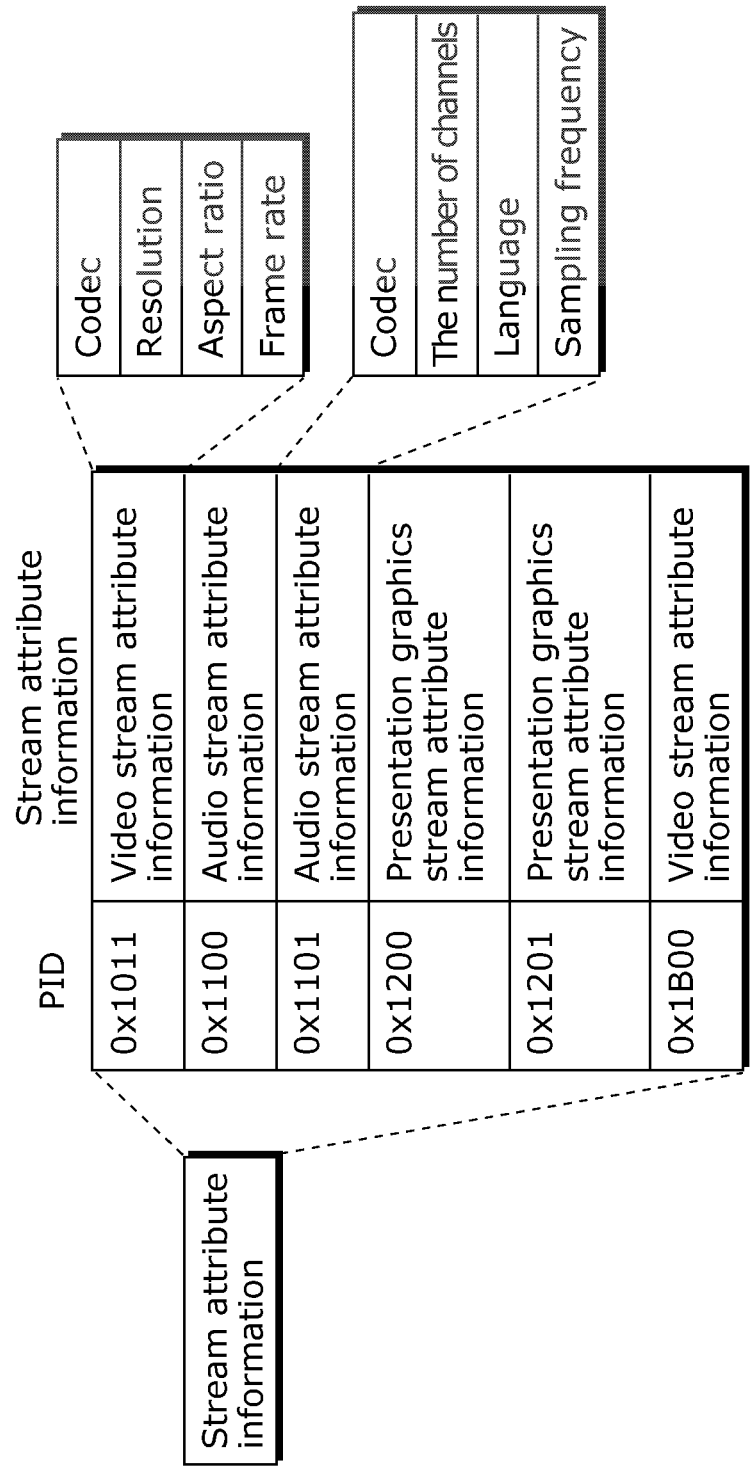
FIG. 24 is a diagram showing an internal structure of stream attribute information.

As shown in FIG. 24, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 25:
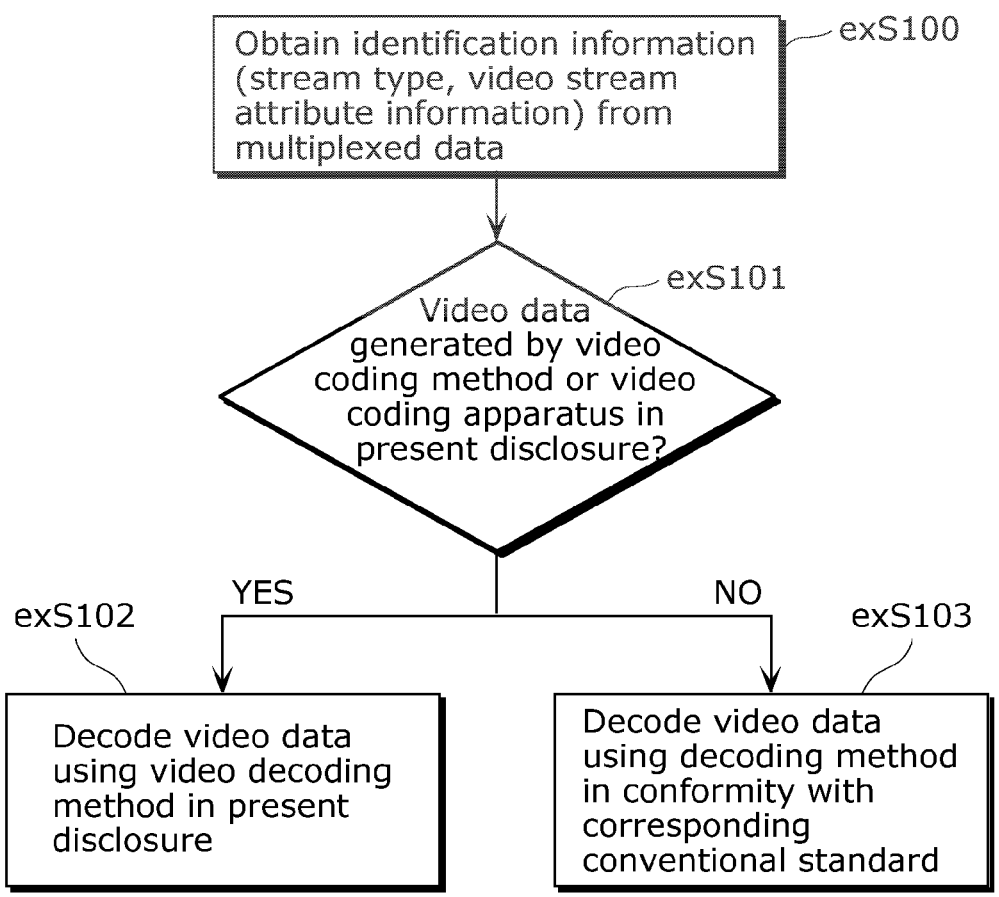
FIG. 25 is a diagram showing steps for identifying video data.

Furthermore, FIG. 25 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 26:
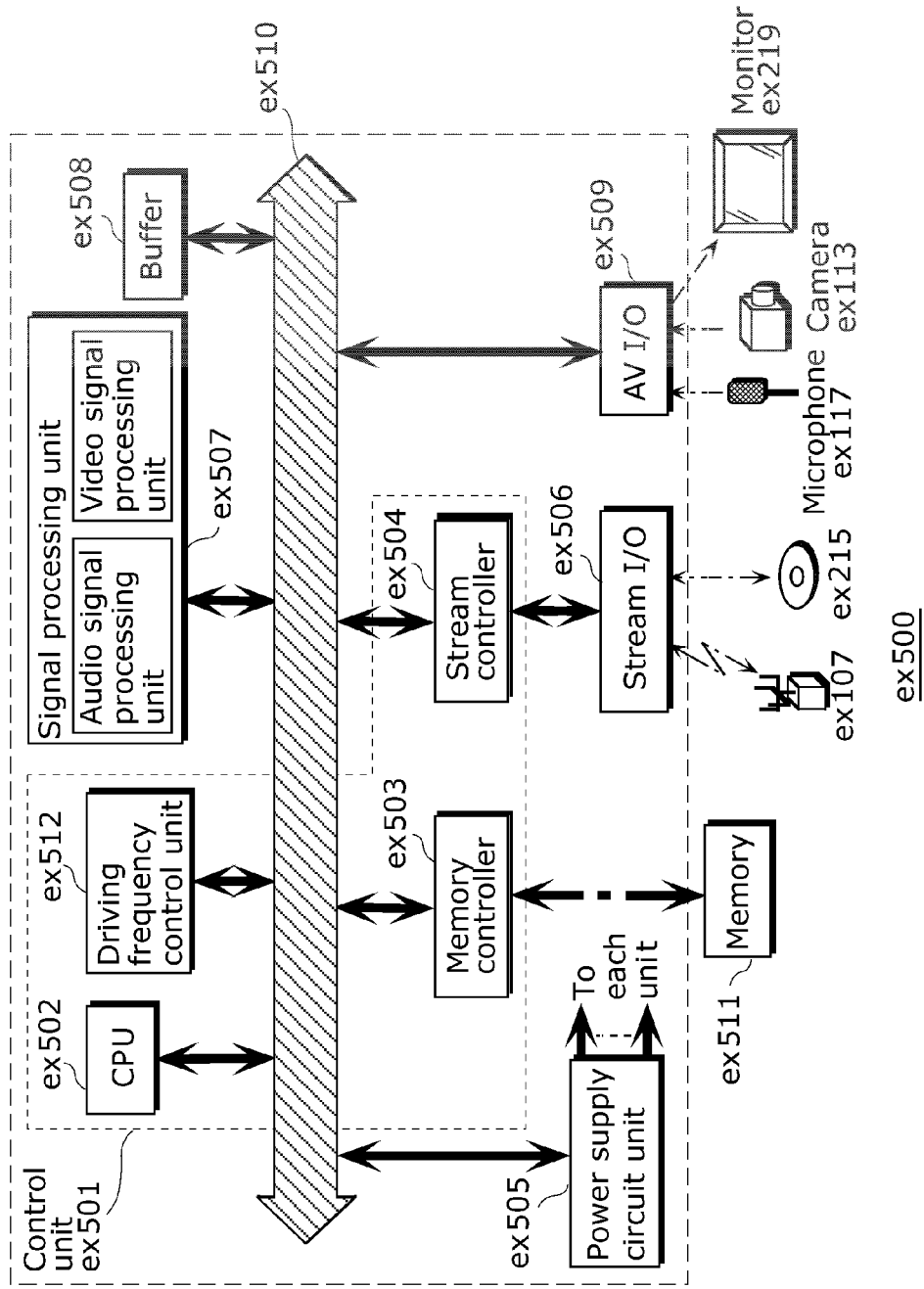
FIG. 26 is a block diagram illustrating an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 26 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Typically, such a programmable logic device can execute the moving picture coding method or moving picture decoding method described in the foregoing embodiments by loading or reading from a memory, etc. a program making up software or firmware.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture coding method or by the moving picture coding apparatus described in each of embodiments is decoded, it is possible for the processing amount to increase compared to when video data that conforms to a conventional standard, such as MPEG-2, MPEG-4 AVC, and VC-1 is decoded. Thus, the LSI ex500 needs to be set to a driving frequency higher than that of the CPU ex502 to be used when video data in conformity with the conventional standard is decoded. However, when the driving frequency is set higher, the power consumption increases.

Figure 27:
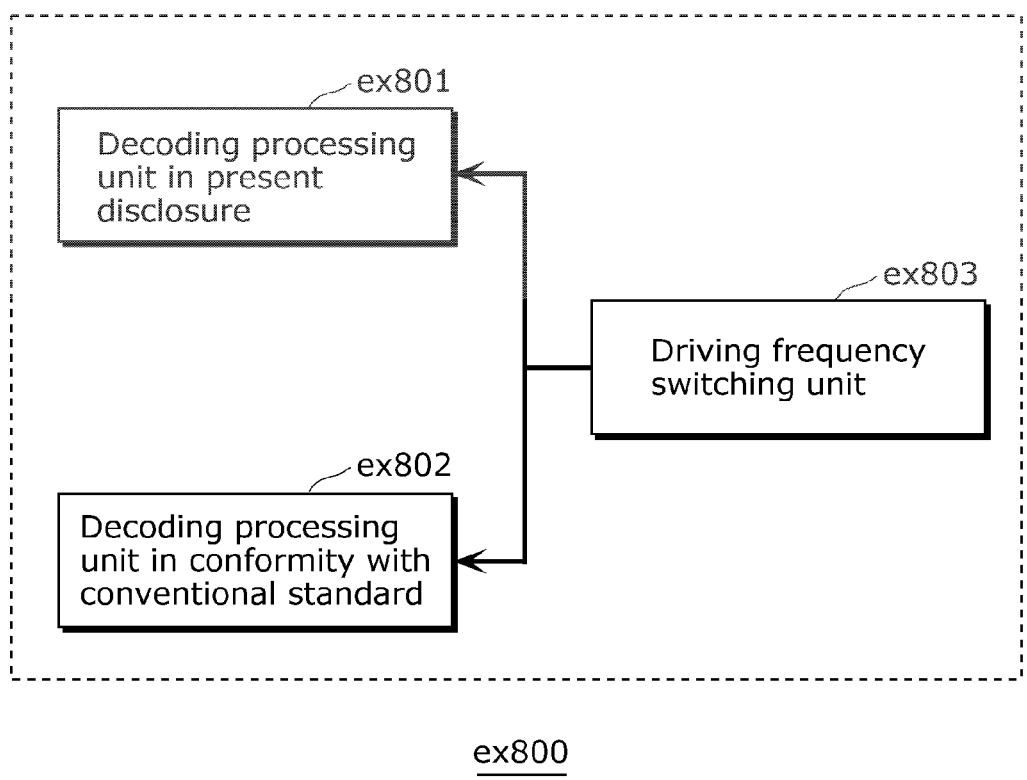
FIG. 27 is a diagram showing a configuration for switching between driving frequencies.

In view of this, the moving picture decoding apparatus, such as the television ex300 and the LSI ex500 is configured to determine to which standard the video data conforms, and switch between the driving frequencies according to the determined standard. FIG. 27 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 26. Here, each of the decoding processing unit ex801 that executes the moving picture decoding method described in each of embodiments and the decoding processing unit ex802 that conforms to the conventional standard corresponds to the signal processing unit ex507 in FIG. 26. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, it is possible that the identification information described in Embodiment 4 is used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 29. The driving frequency can be selected by storing the look-up table in the buffer ex508 and in an internal memory of an LSI, and with reference to the look-up table by the CPU ex502.

Figure 28:
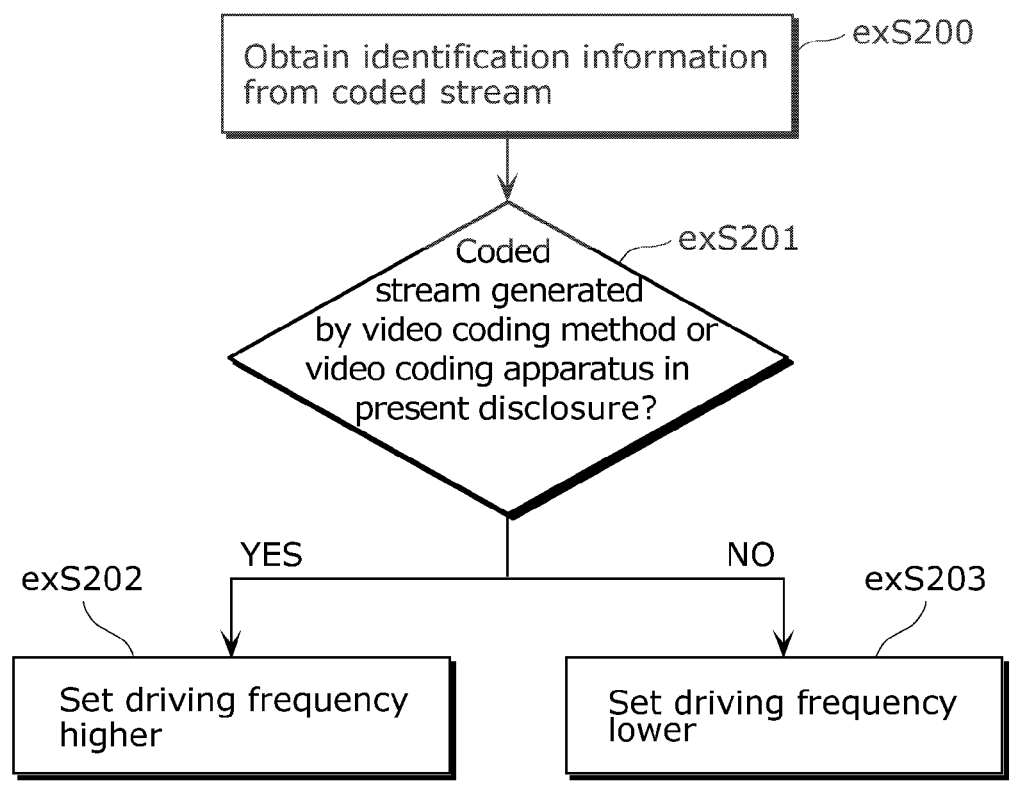
FIG. 28 is a diagram showing steps for identifying video data and switching between driving frequencies.

FIG. 28 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, it is possible that the voltage to be applied to the LSI ex500 or the apparatus including the LSI ex500 is set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, it is possible that the driving frequency is set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, it is possible that the voltage to be applied to the LSI ex500 or the apparatus including the LSI ex500 is set higher. When the identification information indicates that the video data conforms to the conventional standard, such as MPEG-2, MPEG-4 AVC, and VC-1, it is possible that the voltage to be applied to the LSI ex500 or the apparatus including the LSI ex500 is set lower. As another example, it is possible that, when the identification information indicates that the video data is generated by the moving picture coding method and the moving picture coding apparatus described in each of embodiments, the driving of the CPU ex502 is not suspended, and when the identification information indicates that the video data conforms to the conventional standard, such as MPEG-2, MPEG-4 AVC, and VC-1, the driving of the CPU ex502 is suspended at a given time because the CPU ex502 has extra processing capacity. It is possible that, even when the identification information indicates that the video data is generated by the moving picture coding method and the moving picture coding apparatus described in each of embodiments, in the case where the CPU ex502 has extra processing capacity, the driving of the CPU ex502 is suspended at a given time. In such a case, it is possible that the suspending time is set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, increase in the scale of the circuit of the LSI ex500 and increase in the cost arise with the individual use of the signal processing units ex507 that conform to the respective standards.

Figure 30A:
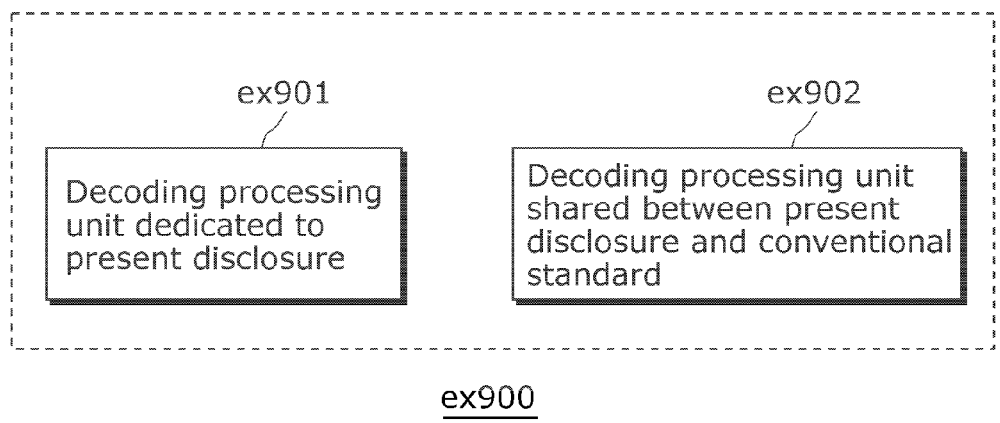
FIG. 30A is a diagram illustrating an example of a configuration for sharing a module of a signal processing unit.

In view of this, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 30A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. It is possible for a decoding processing unit ex902 that conforms to MPEG-4 AVC to be shared by common processing operations, and for a dedicated decoding processing unit ex901 to be used for processing which is unique to an aspect of the present invention and does not conform to MPEG-4 AVC. In particular, since the aspect of the present invention is characterized by inverse quantization, it is possible, for example, for the dedicated decoding processing unit ex901 to be used for inverse quantization, and for the decoding processing unit to be shared by any or all of the other processing, such as entropy decoding, deblocking filtering, and motion compensation. The decoding processing unit for implementing the moving picture decoding method described in each of embodiments may be shared for the processing to be shared, and a dedicated decoding processing unit may be used for processing unique to that of MPEG-4 AVC.

Figure 30B:
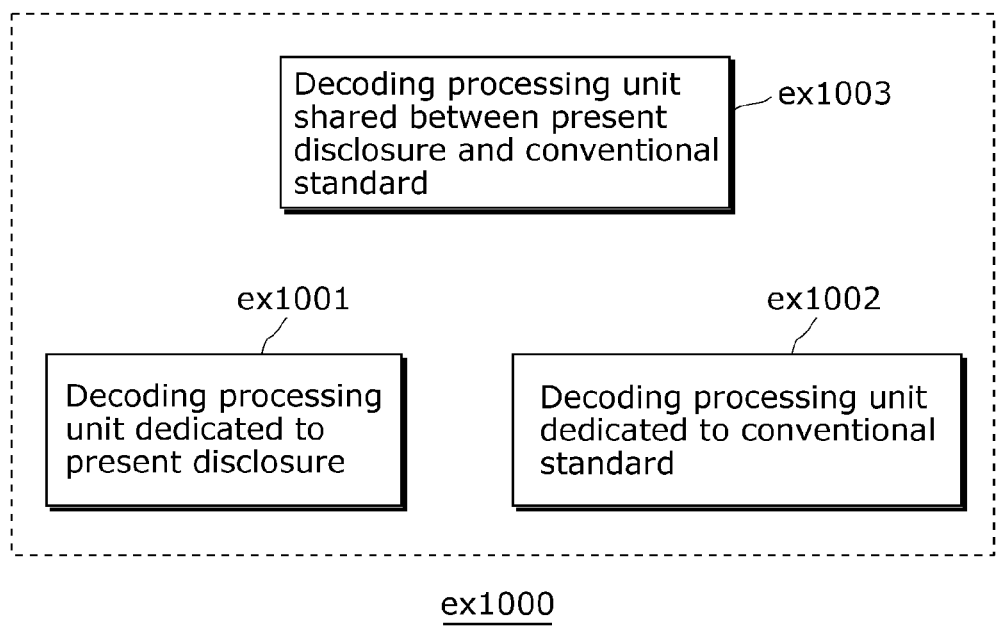
FIG. 30B is a diagram showing another example of a configuration for sharing a module of the signal processing unit.

Furthermore, ex1000 in FIG. 30B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The present disclosure can be used in television receivers, digital video recorders, car navigation systems, cellular phones, digital cameras, digital video cameras, or the like.

The invention claimed is:
1. An image decoding method for decoding an image, the image decoding method comprising:
obtaining setting information for setting a first quantization matrix to be used in the decoding of the image; and
decoding coefficients of the image, using the first quantization matrix set according to the setting information, wherein, in the decoding:

when the setting information includes specifying information for specifying a second quantization matrix and the second quantization matrix specified by the specifying information is referable, the second quantization matrix is set as the first quantization matrix; and when the setting information includes the specifying information and the second quantization matrix specified by the specifying information is not referable, a third quantization matrix which is referable is set as the first quantization matrix, the third quantization matrix not being specified by the specifying information.

2. The image decoding method according to claim 1, wherein, in the obtaining, the setting information for setting quantization matrices by assigning an order number to each of the quantization matrices is obtained.

3. The image decoding method according to claim 2, wherein, in the decoding, when the setting information includes the specifying information and the second quantization matrix to be specified by the specifying information has an order number lower than a leading order number assigned to any one of the quantization matrices, the third quantization matrix is set as the first quantization matrix.

4. The image decoding method according to claim 2, wherein, in the decoding, when the setting information includes the specifying information indicating a difference obtained by subtracting an order number of the second quantization matrix from an order number of the first quantization matrix, and the difference is higher than the order number of the first quantization matrix, the third quantization matrix is set as the first quantization matrix.

5. The image decoding method according to claim 1, wherein, in the obtaining, the setting information for setting quantization matrices by assigning an order number to each of the quantization matrices is obtained, each of the quantization matrices corresponding to a different one of combinations of (i) prediction modes including an intra prediction mode and an inter prediction mode and (ii) components including a luma component and a chroma component, and in the decoding, the coefficients are decoded using the first quantization matrix corresponding to a combination of a first prediction mode and a first component.

6. The image decoding method according to claim 2, wherein the third quantization matrix is a quantization matrix assigned with an order number lower than an order number of the first quantization matrix.

7. The image decoding method according to claim 6, wherein the third quantization matrix is a quantization matrix assigned with a leading order number, among the quantization matrices.

8. The image decoding method according to claim 1, wherein the third quantization matrix is a predetermined default quantization matrix.

9. The image decoding method according to claim 5, wherein, when the first component is the chroma component, the third quantization matrix is a quantization matrix corresponding to a combination of the first prediction mode and the luma component, among the quantization matrices.

10. The image decoding method according to claim 5, wherein, when the first component is the luma component, the third quantization matrix is a default quantization matrix.

11. The image decoding method according to claim 1, wherein, in the decoding, when the setting information includes a matrix value of the first quantization matrix instead of the specifying information, the coefficients are decoded using the first quantization matrix having the matrix value.

12. An image decoding apparatus that decodes an image, the image decoding apparatus comprising:

an obtainment unit configured to obtain setting information for setting a first quantization matrix to be used in the decoding of the image; and a decoding unit configured to decode coefficients of the image, using the first quantization matrix set according to the setting information, wherein, the decoding unit is configured to:

when the setting information includes specifying information for specifying a second quantization matrix and the second quantization matrix specified by the specifying information is referable, set the second quantization matrix as the first quantization matrix; and when the setting information includes the specifying information and the second quantization matrix specified by the specifying information is not referable, set a third quantization matrix which is referable as the first quantization matrix, the third quantization matrix not being specified by the specifying information.

13. An image decoding apparatus that decodes an image, the image decoding apparatus comprising:

processing circuitry; and storage connected to the processing circuit, wherein the processing circuitry executes, using the storage:

obtaining setting information for setting a first quantization matrix to be used in the decoding of the image; and decoding coefficients of the image, using the first quantization matrix set according to the setting information, wherein, in the decoding:

when the setting information includes specifying information for specifying a second quantization matrix and the second quantization matrix specified by the specifying information is referable, the second quantization matrix is set as the first quantization matrix; and when the setting information includes the specifying information and the second quantization matrix specified by the specifying information is not referable, a third quantization matrix which is referable is set as the first quantization matrix, the third quantization matrix not being specified by the specifying information.

* * * * *